US007969599B2

(12) United States Patent
Hamada

(10) Patent No.: US 7,969,599 B2
(45) Date of Patent: Jun. 28, 2011

(54) DEVICE MANAGING SYSTEM, INFORMATION PROCESS APPARATUS, AND CONTROL METHOD THEREOF

(75) Inventor: Noboru Hamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1134 days.

(21) Appl. No.: 11/688,476

(22) Filed: Mar. 20, 2007

(65) Prior Publication Data

US 2007/0229874 A1 Oct. 4, 2007

(30) Foreign Application Priority Data

Mar. 31, 2006 (JP) ................................. 2006-100390

(51) Int. Cl.
*G06F 15/00* (2006.01)
*G03G 21/02* (2006.01)

(52) U.S. Cl. ........................................ 358/1.15; 399/79

(58) Field of Classification Search ................. 358/1.15, 358/1.13, 1.14, 1.16, 1.18, 443, 442, 1.2; 399/79, 384, 394, 17; 715/234, 256, 251; 709/225, 203, 231; 455/408, 466; 379/112.07, 379/133

See application file for complete search history.

(56) References Cited

U.S. PATENT DOCUMENTS

| | | | | |
|---|---|---|---|---|
| 7,167,919 | B2 | 1/2007 | Iwamoto et al. | |
| 7,177,034 | B2 | 2/2007 | Nakagawa et al. | |
| 2003/0105849 | A1 | 6/2003 | Iwamoto et al. | |
| 2005/0275868 | A1* | 12/2005 | Higashiura et al. | 358/1.14 |

FOREIGN PATENT DOCUMENTS

| | | | |
|---|---|---|---|
| JP | 11-095937 | A | 4/1999 |
| JP | 11-134136 | | 5/1999 |
| JP | 2002-297327 | | 10/2002 |
| JP | 2003-205666 | A | 7/2003 |
| JP | 2004-185629 | | 7/2004 |
| JP | 2006-018377 | A | 1/2006 |

OTHER PUBLICATIONS

Office Action dated Dec. 13, 2010, in counterpart Japanese Application No. 2006-100390.

* cited by examiner

*Primary Examiner* — Saeid Ebrahimi Dehkordy

(74) *Attorney, Agent, or Firm* — Fitzpatrick, Cella, Harper & Scinto

(57) ABSTRACT

A method of controlling an information processing apparatus, which counts process amounts in the device for each user, in a system for processing print jobs within a range of access limitation information. The information processing apparatus specifies a user who requests access authority information for a job, and a job whose access authority information is issued to that user. The apparatus checks if a process of the job is completed. The apparatus determines a printable page count of the specified user using an output process amount value of the job issued by the user, when the specified job is complete. The apparatus notifies a managing apparatus, which issues access authority information, of the printable page.

14 Claims, 22 Drawing Sheets

F I G. 1B
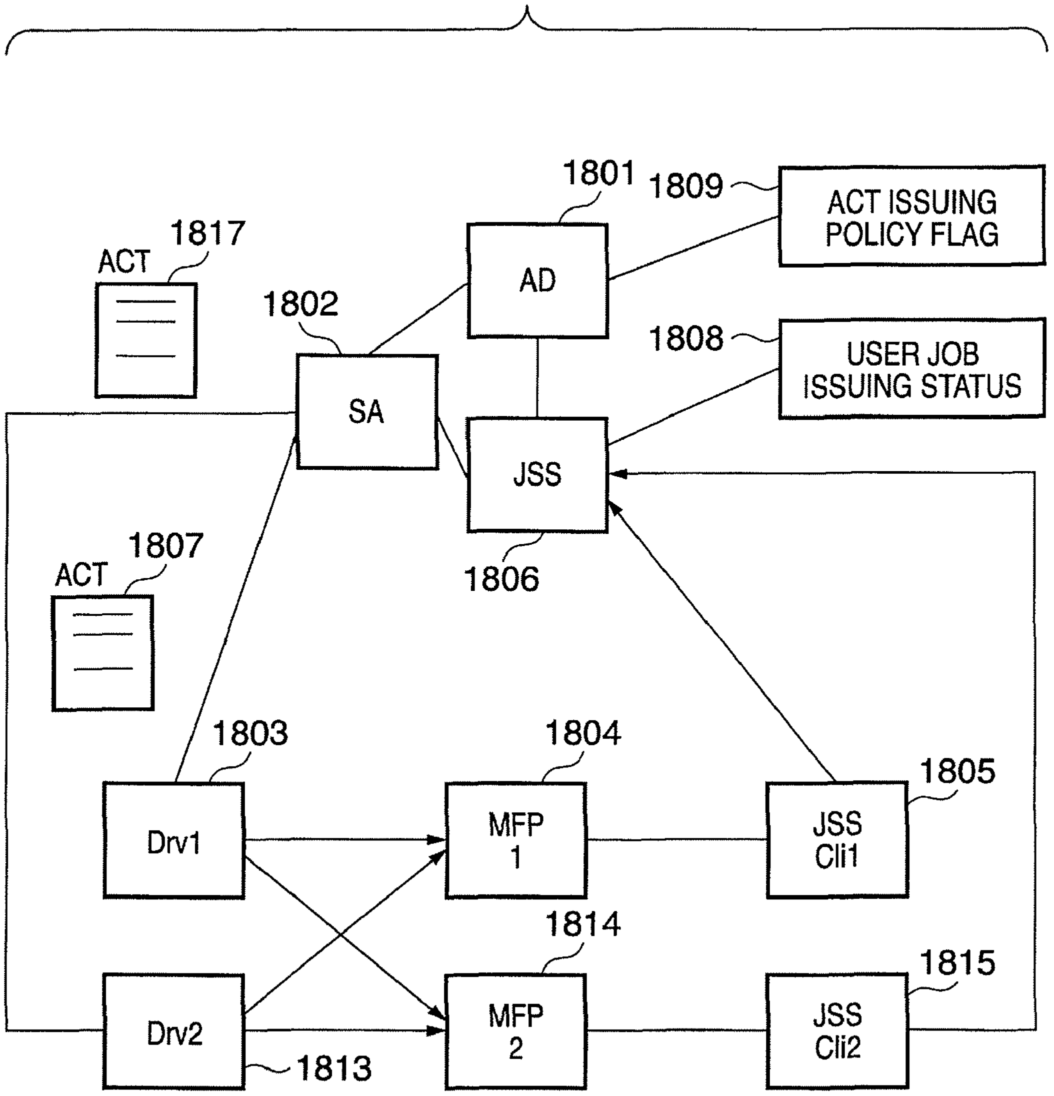

FIG. 7

```xml
<?xml version="1.0" encoding="UTF-8"?>
<ACT xmlns:xsi="http://www.w3.org/2001/XMLSchema-instance">
  <Version>0</Version>
  <UserInfo>
    <UserName>Taro</UserName>
    <BaseRole>PowerUser</BaseRole>
    <UserEmail>taro@xxx.yyy</UserEmail>
  </UserInfo>
  <DeviceInfo>
    <PrintSecurityLevel>0</PrintSecurityLevel>
  </DiviceInfo>
<DeviceAccessControl>
  <AttributeCategoryName="DeviceCapabilityRestriction" CategoryStatus="Static">
    <saml:AttributeStatement>
      <saml:Attribute Name="PdlPrint">
        <saml:AttributeValue Name="PdlPrintFlag">Permit</saml:AttributeValue>
        <saml:AttributeValue Name="ColorPrint">Color</saml:AttributeValue>
        <saml:AttributeValue Name="Simplex">Deny</saml:AttributeValue>
      </saml:Attribute>
    </saml:AttributeStatement>
  </AttributeCategory>
  <AttributeCategoryName="QuotaRestriction" CategoryStatus="Dynamic">
    <saml:AttributeStatement>
      <saml:Attribute Name="Print">
        <saml:AttributeValue Name="ColorPrintTotal">1000</saml:AttributeValue>
        <saml:AttributeValue Name="BwPrintTotal">1000</saml:AttributeValue>
      </saml:Attribute>
    </saml:AttributeStatement>
  </AttributeCategory>
  </DeviceAccessControl>
</ACT>
```

701 (UserInfo block), 702 (DeviceCapabilityRestriction block), 703 (QuotaRestriction block)

F I G. 11

| ID (1101) | BW (1102) | color (1103) | BW limit (1104) | color limit (1105) | InJobFlag (1106) | InJobBW (1107) | InJob color (1108) |
|---|---|---|---|---|---|---|---|
| taro | 94 | 87 | 100 | 100 | true | 2 | 0 |
| jiro | 32 | 6 | 50 | 30 | false | 0 | 0 |
| hanako | 2 | 2 | 20 | 10 | false | 0 | 0 |

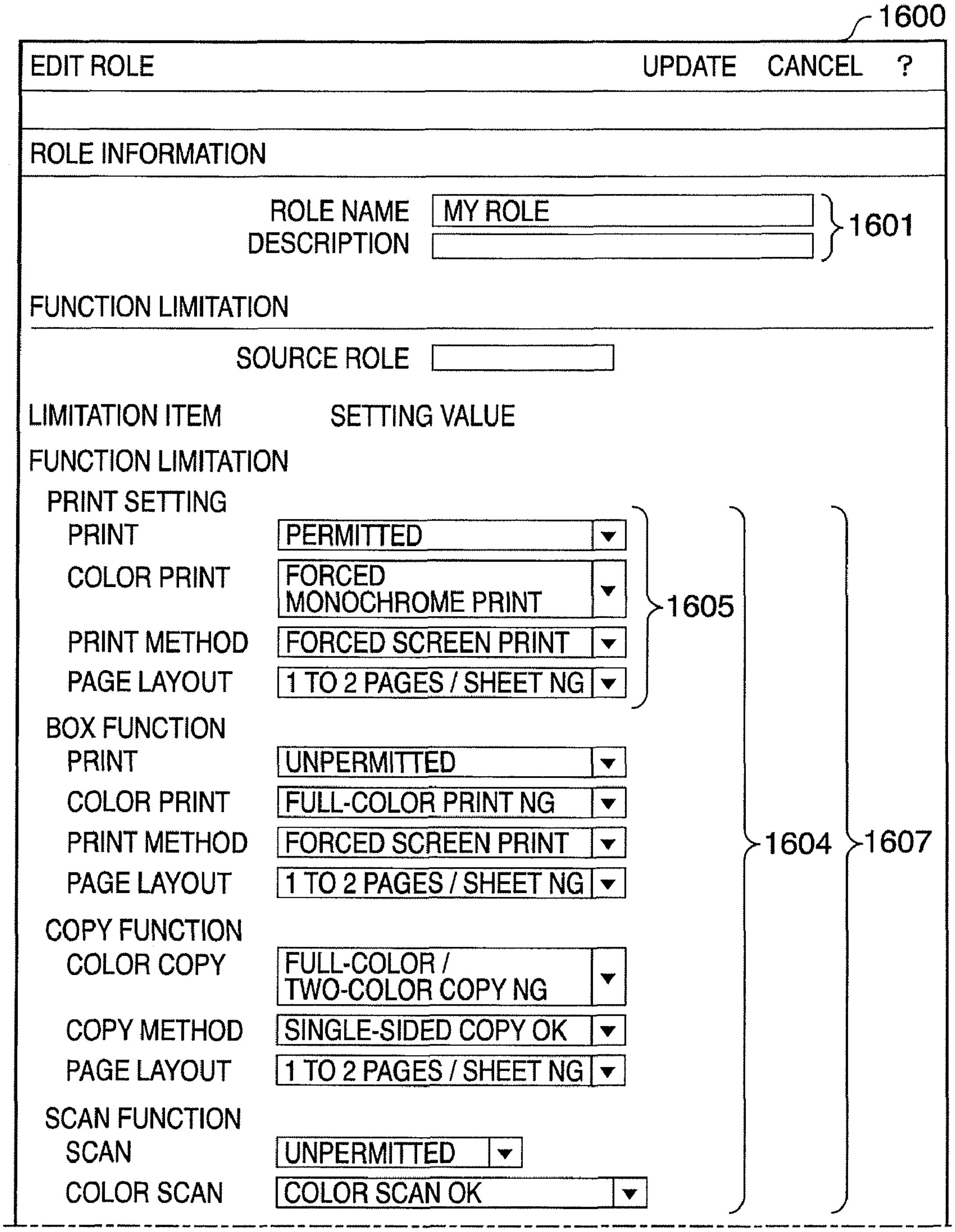

FIG. 17A

```
┌─────────────────────────────────────────────────────────────┐ ─1600
│ EDIT ROLE                          UPDATE   CANCEL   ?      │
├─────────────────────────────────────────────────────────────┤
│                                                             │
│ ROLE INFORMATION                                            │
│                 ROLE NAME   [MY ROLE          ]    ⎫        │
│                DESCRIPTION  [                 ]    ⎬ 1601   │
│                                                    ⎭        │
│ FUNCTION LIMITATION                                         │
│                 SOURCE ROLE [           ]                   │
│                                                             │
│ LIMITATION ITEM        SETTING VALUE                        │
│ FUNCTION LIMITATION                                         │
│   PRINT SETTING                                    ⎫        │
│     PRINT           [PERMITTED          ▼]         ⎪        │
│     COLOR PRINT     [FORCED             ▼]         ⎬ 1605   │
│                      MONOCHROME PRINT              ⎪        │
│     PRINT METHOD    [FORCED SCREEN PRINT ▼]        ⎪        │
│     PAGE LAYOUT     [1 TO 2 PAGES / SHEET NG ▼]    ⎭        │
│   BOX FUNCTION                                     ⎫        │
│     PRINT           [UNPERMITTED        ▼]         ⎪        │
│     COLOR PRINT     [FULL-COLOR PRINT NG ▼]        ⎪        │
│     PRINT METHOD    [FORCED SCREEN PRINT ▼]        ⎬ 1604 ⎬ 1607
│     PAGE LAYOUT     [1 TO 2 PAGES / SHEET NG ▼]    ⎪        │
│   COPY FUNCTION                                    ⎪        │
│     COLOR COPY      [FULL-COLOR /       ▼]         ⎪        │
│                      TWO-COLOR COPY NG             ⎪        │
│     COPY METHOD     [SINGLE-SIDED COPY OK ▼]       ⎪        │
│     PAGE LAYOUT     [1 TO 2 PAGES / SHEET NG ▼]    ⎪        │
│   SCAN FUNCTION                                    ⎪        │
│     SCAN            [UNPERMITTED        ▼]         ⎪        │
│     COLOR SCAN      [COLOR SCAN OK      ▼]         ⎭        │
└─────────────────────────────────────────────────────────────┘
```

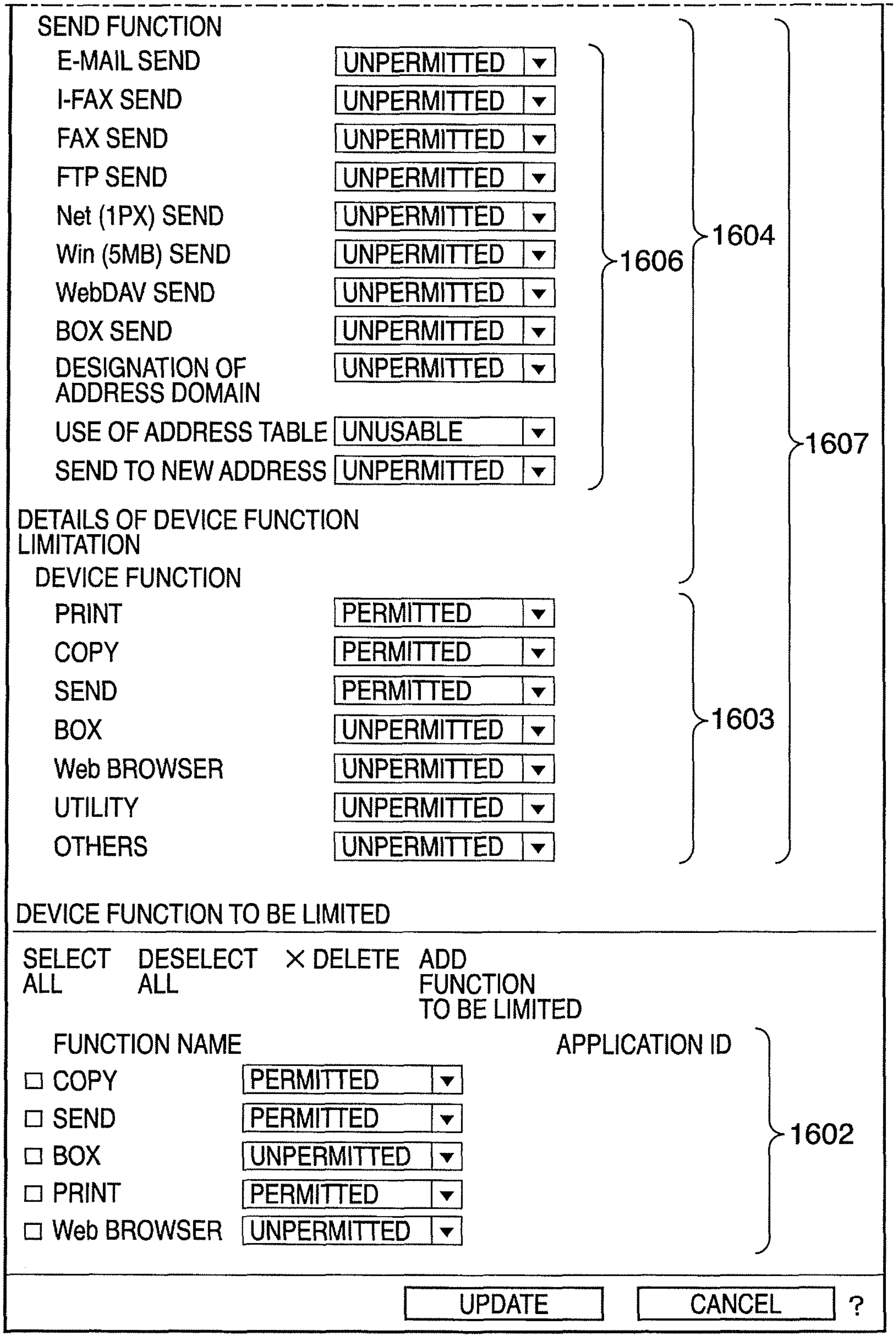

FIG. 17B

| SEND FUNCTION | | |
|---|---|---|
| E-MAIL SEND | UNPERMITTED ▼ | |
| I-FAX SEND | UNPERMITTED ▼ | |
| FAX SEND | UNPERMITTED ▼ | |
| FTP SEND | UNPERMITTED ▼ | |
| Net (1PX) SEND | UNPERMITTED ▼ | ⎫ 1604 |
| Win (5MB) SEND | UNPERMITTED ▼ | ⎬ 1606 |
| WebDAV SEND | UNPERMITTED ▼ | |
| BOX SEND | UNPERMITTED ▼ | |
| DESIGNATION OF ADDRESS DOMAIN | UNPERMITTED ▼ | |
| USE OF ADDRESS TABLE | UNUSABLE ▼ | |
| SEND TO NEW ADDRESS | UNPERMITTED ▼ | |

⎬ 1607

DETAILS OF DEVICE FUNCTION LIMITATION

| DEVICE FUNCTION | | |
|---|---|---|
| PRINT | PERMITTED ▼ | |
| COPY | PERMITTED ▼ | |
| SEND | PERMITTED ▼ | |
| BOX | UNPERMITTED ▼ | ⎬ 1603 |
| Web BROWSER | UNPERMITTED ▼ | |
| UTILITY | UNPERMITTED ▼ | |
| OTHERS | UNPERMITTED ▼ | |

DEVICE FUNCTION TO BE LIMITED

SELECT ALL    DESELECT ALL    × DELETE    ADD FUNCTION TO BE LIMITED

| FUNCTION NAME | | APPLICATION ID |
|---|---|---|
| ☐ COPY | PERMITTED ▼ | |
| ☐ SEND | PERMITTED ▼ | |
| ☐ BOX | UNPERMITTED ▼ | |
| ☐ PRINT | PERMITTED ▼ | |
| ☐ Web BROWSER | UNPERMITTED ▼ | |

⎬ 1602

[ UPDATE ]    [ CANCEL ]    ?

FIG. 18A

```xml
<?xml version="1.0" encoding="UTF-8"?>
<ACT xmlns:xsi="http://www.w3.org/2001/XMLSchema-instance">
  <Version>0</Version>
  <UserInfo>
    <UserName>Taro</UserName>
    <BaseRole>PowerUser</BaseRole>
    <UserEmail>taro@xxx.yyy</UserEmail>
  </UserInfo>
  <DeviceInfo>
    <PrintSecurityLevel>0</PrintSecurityLevel>
  </DeviceInfo>
<DeviceAccessControl>
  <AttributeCategory Name="ApplicationRestriction" CategoryStatus="Static">
    <saml:AttributeStatement>
      <saml:Attribute Name="ApplicationId">
        <saml:AttributeValue Name="UsePossible">1234-5678-90AB-CDEF</saml:AttributeVallue>
        <saml:AttributeValue Name="UsePossible">CDEF-0123-4568-90AB</saml:AttributeVallue>
      </saml:Attribute>
    <saml:Attribute Name="ApplicationCategoryRestriction" CategoryStatus="Static">
        <saml:AttributeValue Name="PrintCategory">Permit</saml:AttributeValue>
        <saml:AttributeValue Name="CopyCategory">Permit</saml:AttributeValue>
        <saml:AttributeValue Name="SendCategory">Permit</saml:AttributeValue>
        <saml:AttributeValue Name="BoxCategory">Permit</saml:AttributeValue>
        <saml:AttributeValue Name="UtilityCategory">Deny</saml:AttributeValue>
      </saml:Attribute>
    </saml:AttributeStatement>
  </AttributeCategory>
```

1701 (AttributeCategory "ApplicationRestriction" through </saml:AttributeStatement>)

1702 (the two UsePossible AttributeValue lines)

1703 (the five category AttributeValue lines)

FIG. 18B

```
<AttributeCategory Name="DeviceCapabilityRestriction" CategoryStatus="Static">
  <saml:AttributeStatement>
    <saml:Attribute Name="PdlPrint">
      <saml:AttributeValue Name="PdlPrintFlag">Permit</saml:AttributeValue>
      <saml:AttributeValue Name="ColorPrint">Color</saml:AttributeValue>
      <saml:AttributeValue Name="Simplex">Deny</saml:AttributeValue>
      <saml:AttributeValue Name="Nup">2</saml:AttributeValue>
    </saml:Attribute>
  <saml:Attribute Name="Send">
      <saml:AttributeValue Name="SendFlag">Permit</saml:AttributeValue>
      <saml:AttributeValue Name="Email">Deny</saml:AttributeValue>
      <saml:AttributeValue Name="Fax">Permit</saml:AttributeValue>
      <saml:AttributeValue Name="Ftp">Deny</saml:AttributeValue>
    </saml:Attribute>
  <saml:AttributeStatement>
</AttributeCategory>
<Attribute Category Name="QuotaRestriction" CategoryStatus="Dynamic">
  <saml:AttributeStatement>
    <saml:Attribute Name="Print">
      <saml:AttributeValue Name="ColorPrintTotal">1000</saml:AttributeValue>
      <saml:AttributeValue Name="BwPrintTotal">1000</saml:AttributeValue>
    </saml:Attribute>
  </saml:AttributeStatement>
</AttributeCategory>
</DeviceAccessControl>
</ACT>
```

1704 (first AttributeCategory block), 1705 (PdlPrint attribute values), 1706 (Send attribute values)

DEVICE MANAGING SYSTEM, INFORMATION PROCESS APPARATUS, AND CONTROL METHOD THEREOF

BACKGROUND OF THE INVENTION

1. Field of the Invention

The present invention relates to a device managing system having a device which prints based on jobs, an issuing server which issues information for limiting access to the device, a client which issues the jobs including the information received from the server and a counting server which counts process amounts of the device for each user. The present invention also relates to an information process apparatus, a managing apparatus and a method of controlling the managing apparatus.

2. Description of the Related Art

In recent years, copying machines have not only a function of copying documents, but also a plurality of different functions such as a function of printing print jobs from external clients, a function of digitally sending scanned documents using an e-mail or file transfer function, and the like. Such a copying machine is called an MFP (Multi Function Peripheral).

The MFP has gained more functions, while a problem in terms of information management such as a high risk for information leakage due to capability of sending of scanned information or the like is posed. Although this is an old problem, since the cost of paper sheets and toners increases with increasing printed page count, a demand has arisen for limiting a printable page count for each user.

Solving these problems is an important issue in terms of a TCO (Total Cost of Ownership) reduction. When this issue is viewed from the viewpoint of the administrators of a system and device, it is required to integrally set functions and the upper limit page count which are available for each user and to appropriately manage the quantities of resources (e.g., the number of paper sheets and the like) used by each user.

To solve this problem, some solutions have already been proposed.

For example, Japanese Patent Laid-Open No. 11-134136 proposes a method of managing users using IDs, and limiting functions, resources, and times that can be used for respective IDs.

As another technique, as a method of limiting functions, a method in which a management server generates a "print token" serving as print function limiting information and distributes it in advance to respective printers to limit functions is described.

Furthermore, Japanese Patent Laid-Open No. 2004-185629 discloses a technique for sending a job appended with an access limitation ticket issued by the server to an MFP, and limiting printing of the MFP. Also, Japanese Patent Laid-Open No. 2002-297327 discloses a technique in which a server collects job logs from printing devices and clients, tabularizes them, and limits use of printing devices based on the job logs.

Japanese Patent Laid-Open No. 11-134136 describes function limitations upon directly manipulating devices such as copying machines and the like. However, parent reference 1 does not describe any arrangement for appropriately limiting the upper limit page count in the whole system even when a device operates in response to a request from another node.

In another technique, the upper limit page count can be strictly controlled for each print device, but the upper limit available page count must be determined for each device, resulting in a low degree of freedom in settings. Originally, it is desirable to set the upper limit of the available page count in the whole system for each user in place of each print device.

In the prior art, when a new job is issued before completion of the process of a job, a problem that the user is consequently allowed to output more than what is necessary is posed. For example, the user prints jobs in large quantities, and also wants to issue a print instruction of another job. In this case, before completion of counting of print process amounts by a counting device, a management apparatus determines based on previous process amounts whether or not to issue an access limitation ticket. Hence, access limitation information may be undesirably issued in some cases.

SUMMARY OF THE INVENTION

The present invention provides a device managing system, an information process apparatus, a managing apparatus, control methods thereof, and a program, which may integrally manage use limitations of functions and resources of a device available for each user while assuring a high degree of freedom in management.

According to one aspect of the present invention, the foregoing problem is solved by providing a device managing system in which an issuing server which issues access limitation information associated with a device, a client which issues a job including the access limitation information acquired from the issuing server, the device which prints based on the job, and a counting server which counts process amounts in the device for each user, the counting server comprises an acquiring unit adapted to acquire a value indicated by an issuing policy flag associated with issuance of the access limitation information and managed by a managing apparatus, a holding unit adapted to hold, for each user, an in-process job flag indicating if a job process is in progress, and a notifying unit adapted to, when a query about a printable page count in the device for a user of the client which issued the job is received from the issuing server, notify the issuing server of a reply to the query based on the value indicated by the issuing policy flag acquired by the acquiring unit and a value indicated by the in-process job flag, and the issuing server comprises a receiving unit adapted to receive an issuing request of access limitation information of the device for the user of the client from the client which issued the job, a sending unit adapted to send a query about a printable page count in the device to the counting server based on the issuing request received by the receiving unit and a generating unit adapted to generate the access limitation information based on a reply from the counting server to the query sent by the sending unit.

According to another aspect of the present invention, the foregoing problem is solved by providing an information process apparatus which collects output logs of jobs in a system for processing print jobs within a range of access limitation information, comprising a specifying unit adapted to specify a user who requests access authority information for a job, and a job whose access authority information is issued to that user, a checking unit adapted to check if a process of the job specified by the specifying unit is completed, a determining unit adapted to determine a printable page count of the user specified by the specifying unit using an output process amount value of the job issued by the user when the checking unit determines that the job specified by the specifying unit is complete and a notifying unit adapted to notify a managing apparatus, which issues access authority information, of the printable page determined by the determining unit.

According to still another aspect of the present invention, the foregoing problem is solved by providing a managing apparatus for issuing access limitation information indicating a function limitation of an image process apparatus, comprising an acquiring unit adapted to acquire an issuing request of the access limitation information, a specifying unit adapted to specify a user who issued the request of the access limitation information acquired by the acquiring unit, a checking unit adapted to check if a process of a job issued by the user specified by the specifying unit is completed and an issuing unit adapted to wait until completion of the job issued by the user specified by the specifying unit, and issuing, using an output process amount value of the job issued by the user, access limitation information corresponding to the user who requests to issue the access limitation information in response to completion of the process of the job determined by the checking unit.

According to yet another aspect of the present invention, the foregoing problem is solved by providing a method of controlling an information process apparatus which collects output logs of jobs in a system for processing print jobs within a range of access limitation information, comprising the steps of specifying a user who requests access authority information for a job, and a job whose access authority information is issued to that user, checking if a process of the specified job is completed, determining, when it is determined that the process of the specified job is complete, a printable page count of the specified user using an output process amount value of the job issued by the user and notifying a managing apparatus, which issues access authority information, of the determined printable page.

According to still yet another aspect of the present invention, the foregoing problem is solved by providing a method of controlling a managing apparatus for issuing access limitation information indicating a function limitation of an image process apparatus, comprising the steps of acquiring an issuing request of the access limitation information, specifying a user who issued the acquired request of the access limitation information, checking if a process of a job issued by the specified user is completed and issuing access limitation information corresponding to the user using an output process amount value of the job issued by the user in response to determination of completion of the process of the job issued by the specified user.

Further features of the present invention will become apparent from the following description of exemplary embodiments with reference to the attached drawings.

BRIEF DESCRIPTION OF THE DRAWINGS

FIG. 1B is a block diagram showing the logical configuration of the overall device managing system according to the first embodiment of the present invention;

FIG. 7 shows an example of an access control token according to the first embodiment of the present invention;

FIG. 11 is a table showing an example of process amount data held by a counting server according to the first embodiment of the present invention;

FIGS. 17A and 17B show an example of an operation dialog of an administrator utility according to the fifth embodiment of the present invention;

FIGS. 18A and 18B show an example of an access control token according to the fifth embodiment of the present invention.

DESCRIPTION OF THE EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

A preferred embodiment implements an arrangement which can set in advance and integrally manage functions of a device and the upper limit value of resources which can be used by each user. Also, a preferred embodiment implements an arrangement which can realize control that prevents the amount of resource consumption (assigned resources) assigned to each user from exceeding the upper limit value even when users make operations for a device at a plurality of nodes.

Furthermore, a preferred embodiment implements an arrangement which manages by switching between a strict operation mode that strictly applies control for preventing the amount of consumption of assigned resources for each user from exceeding the upper limit value, and a lenient operation mode which accepts a job issuing request from a given user if at least some of the resources assigned to that user remain.

In particular, as a background of implementation of such arrangements, there is a time lag from issuance of an access limitation ticket or completion of printing until a server counts process amounts. That is, it is required to select during this time lag whether the user is permitted to issue the next job without confirming a printable page count of that user (lenient operation mode) or the user is inhibited from issuing the next job Until the printable page count is confirmed.

First Embodiment

Figure 1A:
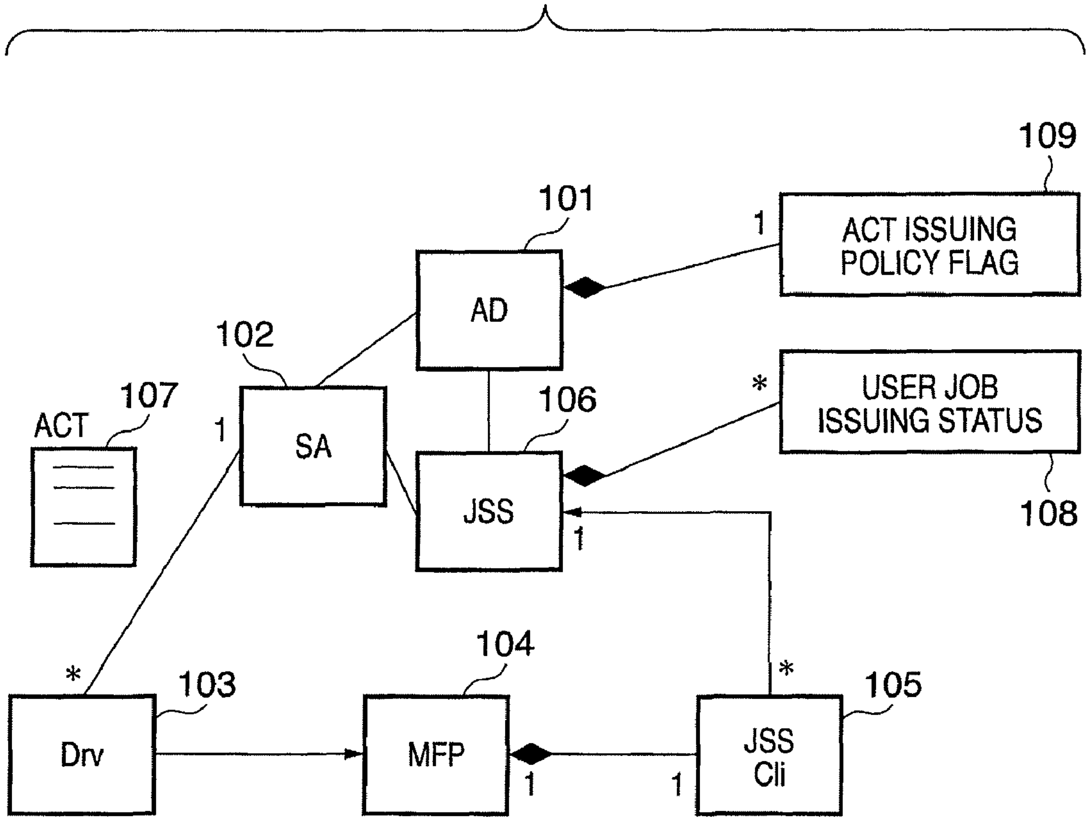
FIG. 1A is a class diagram showing the logical configuration of the overall device managing system according to the first embodiment of the present invention.

FIG. 1A is a class diagram showing the logical configuration of the overall device managing system according to the first embodiment of the present invention.

FIG. 1A describes using a description method of UNL (Universal Modeling Language).

Referring to FIG. 1A, reference numeral 101 denotes a user information server (AD) which holds user IDs and passwords, and function limitation information indicating which functions each user is permitted to use in the system. The user information server 101 is implemented using a server, for example, an LDAP server, Active Directory server, or the like.

Note that LDAP is a short for Lightweight Directory Access Protocol.

Reference numeral 102 denotes a ticket issuing server (SA). This ticket issuing server 102 issues a ticket that describes information about usable functions based on the function limitation information for each user stored in the user information server 101 and job execution process amounts of each user stored in a counting server (JSS) 106. This ticket is called an access control token (ACT) 107.

More specifically, a printer driver (Drv) 103 sends to the ticket issuing server 102 an ACT issuing request appended with identification of a user who wants to issue a job. The ticket issuing server 102 acquires function limitation information corresponding to the user, who wants to issue a job, of those stored in the user information server 101.

The ticket issuing server 102 acquires job execution process amounts corresponding to the user, who issued the ACT issuing request, from the counting server 106. The ticket issuing server 102 determines the setting contents of a job to be permitted to the user based on the acquired function limitation information and job execution process amounts.

The ticket issuing server 102 generates an ACT 107 that reflects the setting contents of the job. The ticket issuing server 102 appends a digital signature which proves issuance by the server 102 to the ACT 107, and then sends the ACT 107 to the printer driver 103. The printer driver 103 sends the job and ACT 107 to a copying machine (MFP) 104.

The ACT 107 will be described in a little more detail below. The ACT 107 is data which has a role to transfer access limitation information available for each user on the system. The ACT 107 describes information associated with function limitation items upon execution of jobs, the upper limit values including the upper limit printable page count, and the like for each user.

Note that the device managing system of the first embodiment is configured by a device, servers, and client PC connected on the network. As this device managing system, the first embodiment will exemplify a print managing system which imposes access limitations and job execution limitations such as the printable page count and the like for each user who uses the device. Also, the user includes units such as an individual user, department, organization, and the like.

The printer driver 103 runs on a client PC (not shown). Upon using that client PC, the user must log on to a server to prove which user is using that client PC.

The copying machine 104 (for example, multi function peripheral (MFP) or the like) as one of the devices has not only a copy function of copying paper documents but also a print function of printing print data sent from the external printer driver 103. Furthermore, the copying machine 104 has a SEND function of reading paper documents and sending image data of the read paper documents to an external file server or a mail address.

Reference numeral 105 denotes a counting client (JSS Cli). The counting client 105 runs on each copying machine 104, and notifies the counting server 106 of job execution process amounts such as printed page counts and the like of each user on that copying machine 104.

The counting client 105 may tabularize the job execution process amounts over a plurality of devices (e.g., printers). The job execution process amounts include printed page counts and the like. In this way, the counting client 105 can hold job execution process amounts of respective users in the data managing system.

The counting server 106 tabularizes job execution process amounts for respective users notified by the counting client 105 over a plurality of printing devices (in the first embodiment, copying machines 231 and 232 or copying machines 1804 and 1814 to be described later). The counting server 106 then holds the print process amounts of respective users in the whole system. In this case, the counting server 106 collects job execution process amounts, which are acquired from the copying machine 104 by the printer driver 103, via the counting client 105.

Detailed operations or collaborations among respective classes 101 to 107 in FIG. 1A will be apparent from the following description.

The ACT 107 is an access control token which describes information associated with functions executable on the copying machine 104 or the upper limit printable page count for each user on that machine. The ticket issuing server 102 generates the ACT 107 based on an ACT issuing request from the printer driver 103 to the ticket issuing server 102, and returns it to the printer driver 103.

The printer driver 103 appends that ACT 107 to a print job, and sends the print job to the copying machine 104. That is, the ACT 107 is transferred from the ticket issuing server 102 to the copying machine 104 via the printer driver 103.

Reference numeral 108 denotes a user job issuing status which indicates whether or not a print job using a given ACT 107 is completed after issuance of that ACT token 107, in correspondence with each individual user. The user job issuing status 108 is a part of the counting server 106, and is stored in the counting server 106 as data to be managed by that server 106. The user job issuing status 108 assumes a value of "true" or "false".

Reference numeral 109 denotes an ACT issuing policy flag which defines an issuing policy of the ACT 107 in the whole system. The ACT issuing policy flag 109 assumes a value of "true (valid)" or "false (invalid)".

The ticket issuing server 102 issues the ACT 107 indicating function limitations of devices such as the copying machine 104 and the like, as described above. The ticket issuing server 102 acquires an issuing request of the ACT 107. The ticket issuing server 102 specifies the user who requests access limitation information acquired by itself. The ticket issuing server 102 checks if the process of a job issued by the user who is specified by the ticket issuing server 102 is completed.

Note that an example of the checking process in the ticket issuing server 102 will be described later.

Next, the ticket issuing server 102 waits until the job issued by the specified user is completed. In response to determination of completion of the job process, the ticket issuing server 102 issues an ACT 107 corresponding to the user who requests to issue the ACT 107 using the output process amount values of jobs issued by that user.

The ticket issuing server 102 determines that the job process is complete when it receives a notification indicating completion of the printable page count or the job process from the counting server 106 which collects the output process amount values of jobs. Note that the system may comprise an input interface used to input whether or not the ticket issuing server 102 waits until completion of the process of a job issued by the user and then issues access limitation information. The input interface can load external setting files and allows inputs via a user interface displayed on a CRT.

The use method of the user job issuing status 108 and ACT issuing policy flag 109 will be described later in a description of the operation of the system.

FIG. 1A explains the configuration of the device managing system using the UML description method. By contrast, FIG. 1B shows the configuration described as a normal block diagram. In FIG. 1A, respective rectangular building components indicate classes. However, in FIG. 1B, rectangular building components represent instances as entities upon actual operations. In FIG. 1A, a multiplicity indicating how many instances the class of interest is likely to generate is described at the end of each line which represents the relationship between neighboring classes. By contrast, since FIG. 1B is a normal block diagram, and the rectangular building components indicate instances, no multiplicity is described in FIG. 1B.

In particular, FIG. 1B is a block diagram taking a case of two MFPs 1804, 1814 as an example, and describes the same arrangement as in FIG. 2 to be described later. However, the number of MFPs is not limited to this.

In FIG. 1B, reference numerals 1801 to 1809 respectively correspond to reference numerals 101 to 109 in FIG. 1A. Also, reference numerals 1813 to 1815 and 1817 respectively correspond to reference numerals 103 to 105 and 107 in FIG. 1A.

One allocation example of respective functional components in the device managing system shown in FIG. 1A will be described below using FIG. 2.

Figure 2:
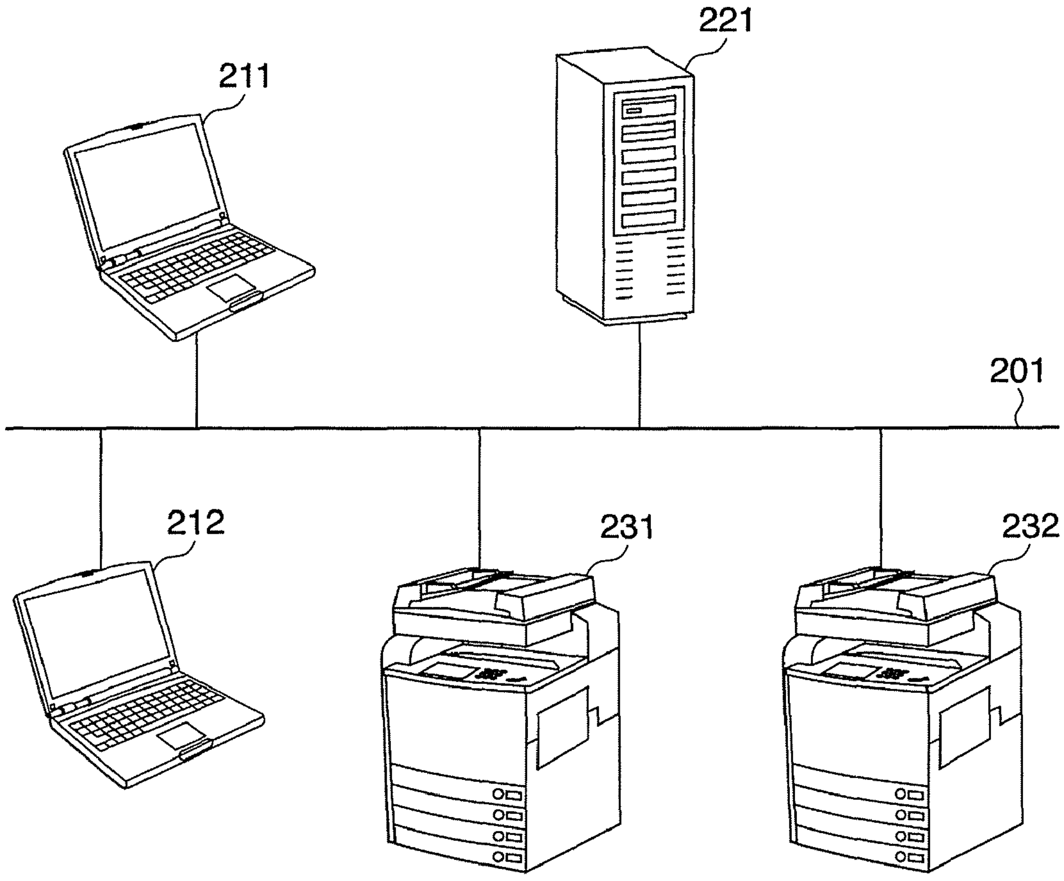
FIG. 2 is a diagram showing an allocation example of functional components in the device managing system shown in FIG. 1A according to the first embodiment of the present invention.

FIG. 2 shows one allocation example of functional components in the device managing system shown in FIG. 1A according to the first embodiment of the present invention.

Referring to FIG. 2, reference numerals 211 and 212 denote client PCs. The printer driver 103 in FIG. 1A runs on the client PC 211 or 212.

Reference numeral 221 denotes a server PC. The user information server 101, ticket issuing server 102, and counting server 106 shown in FIG. 1A run on the server PC 221.

Reference numeral 231 denotes a copying machine which corresponds to the copying machine 104 in FIG. 1A. The copying machine 231 includes the counting client 105 in FIG. 1A.

The client PCs 211 and 212, server PC 221, and copying machines 231 and 232 are connected to each other via a network 201, and exchange information via the network 201.

Note that the network 201 is typically implemented by one of the Internet, a LAN, WAN, telephone line, dedicated digital line, ATM or frame relay line, communication satellite line, cable TV line, data broadcast wireless line, and the like. Or the network 201 is a so-called communication network implemented by a combination of these lines, and need only be used to exchange data.

The configuration shown in FIG. 1A is merely an example. For this reason, all of the client, servers, and printer driver may be implemented by a client computer or they may be implemented using some server computers.

Interfaces between neighboring building components of the system in FIG. 1A may respectively be physical communication media such as a CPU bus and the like or may be configured by logical interfaces for message communications implemented by software. The aforementioned functional components may execute respective functions when a CPU executes programs, or may be implemented as hardware circuits.

Note that the interfaces between the neighboring building components in the system shown in FIG. 1A include, for example, an interface between the printer driver 103 and ticket issuing server 102, and an interface between the ticket issuing server 102 and counting server 106. Also, the interfaces include an interface between the ticket issuing server 102 and user information server 101, and an interface between the counting client 105 and counting server 106.

The client PCs 211 and 212 belong to the same domain as the server PC 221 on which the user information server 101 runs, and user IDs and passwords are managed by the user information server 101. When the user uses the client PC 211 or 212, he or she must log on to the domain at the beginning of use.

An overview of the operation of the whole device managing system shown in FIG. 1A will be described below.

When the printer driver 103 issues a print job to the copying machine 104, it requests the ticket issuing server 102 to issue an ACT 107 that describes usable functions of the user using the user ID as an argument.

The printer driver 103 appends the ACT 107 received from the ticket issuing server 102 to a part of the header of a job, and transmits that job to the copying machine 104.

Figure 3:
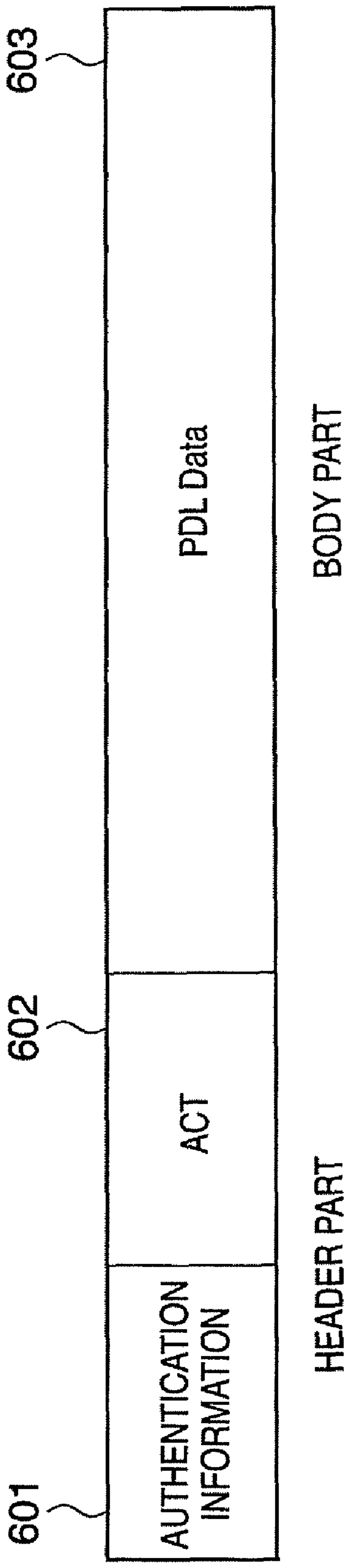
FIG. 3 shows an example of a job according to the first embodiment of the present invention.

FIG. 3 shows an example of a job. The job includes a header part and body part. More specifically, the job includes authentication information 601 indicating the user who issued the job, an access control token (ACT) 602, and a body part 603 indicating the work content to be requested to the device (copying machine 104). In this example, this job requests to print data included in the body part 603. The ACT 602 in FIG. 3 corresponds to the ACT 107 which is received by the printer driver 103 from the ticket issuing server 102 in FIG. 1A.

Upon reception of the job, the copying machine 104 compares a list of usable functions described in the ACT 602 in the received job data with request contents described in the body part 603. As a result of the comparison, if the request contents are included in the usable functions, the copying machine 104 executes the job according to the request contents. Otherwise, the copying machine 104 cancels the job.

An example of the internal arrangement of an information processing apparatus which implements the client PC 211 or 212 or the server PC 221 will be described below using FIG. 4.

Figure 4:
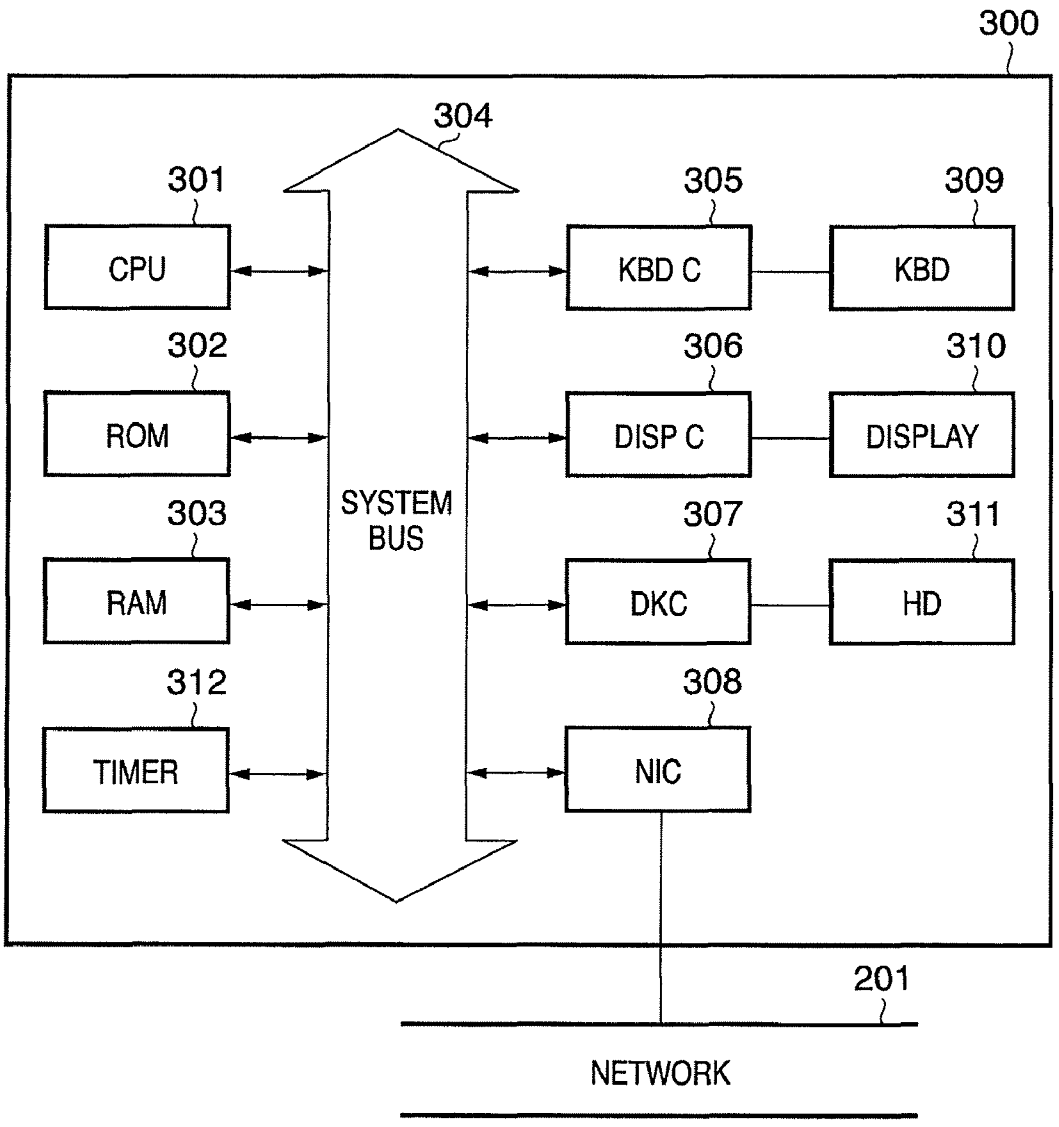
FIG. 4 is a block diagram showing the arrangement of an information process apparatus according to the first embodiment of the present invention.

FIG. 4 is a block diagram showing the arrangement of an information process apparatus according to the first embodiment of the present invention.

Referring to FIG. 4, reference numeral 300 denotes a PC main body. The PC 300 as an information process apparatus comprises a CPU 301 which executes software stored in a ROM 302 or a large-capacity storage device 311 (for example, a hard disk or the like). The CPU 301 systematically controls respective devices connected to a system bus 304.

Reference numeral 303 denotes a RAM which serves as a main memory, work area, and the like of the CPU 301. Reference numeral 305 denotes a keyboard controller (KBD C), which controls instruction inputs from a keyboard (KBD) 309 equipped on the PC 300. Reference numeral 306 denotes a display controller (DISP C), which controls display on a display module (DISPLAY) 310 comprising, e.g., a liquid crystal display or the like.

Reference numeral 307 denotes a disk controller (DKC) which controls the large-capacity storage device (e.g., a hard disk (HD) or the like) 311. Reference numeral 308 denotes a network interface card (NIC), which exchanges data in two ways with other nodes via the network 201. Reference numeral 312 denotes a timer (Timer), which is used in a time measurement function of the PC 300.

An example of the internal arrangement of a device (image forming device) which implements the copying machine 231 or 232 will be described below using FIG. 5.

Figure 5:
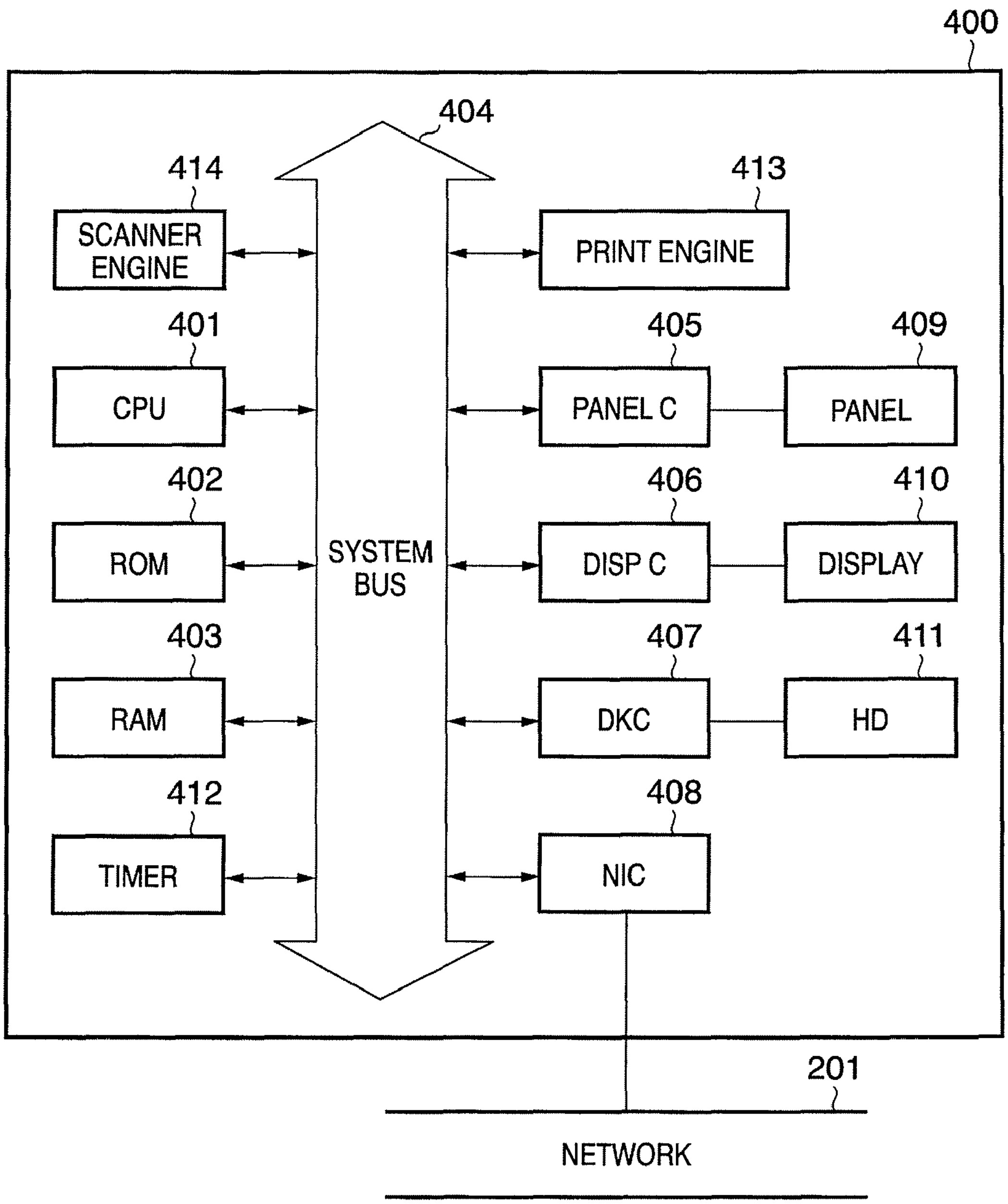
FIG. 5 is a block diagram showing the arrangement of a device according to the first embodiment of the present invention.

FIG. 5 is a block diagram showing the arrangement of the device according to the first embodiment of the present invention.

Referring to FIG. 5, reference numeral 400 denotes a copying machine main body. The copying machine 400 comprises a CPU 401, which executes software stored in a ROM 402 or a large-capacity storage device 411 (for example, a hard disk (HD) or the like). The CPU 401 systematically controls respective devices connected to a system bus 404.

Reference numeral 403 denotes a RAM which serves as a main memory, work area, and the like of the CPU 401. Reference numeral 405 denotes a panel controller (Panel C), which controls instruction inputs from an operation panel (Panel) 409 equipped on the copying machine. Reference numeral 406 denotes a display controller (DISP C), which controls display on a display module (DISPLAY) 410 comprising, e.g., a liquid crystal display or the like.

Reference numeral 407 denotes a disk controller (DKC) which controls the large-capacity storage device (e.g., a hard disk (HD) or the like) 411. Reference numeral 408 denotes a network interface card (NIC), which exchanges data in two ways with other nodes via the network 201. Reference numeral 412 denotes a timer (Timer), which is used in a time measurement function of the device 400.

Reference numeral 413 denotes a print engine, which executes a print operation under the control of the CPU 401. Note that the print engine 413 executes printing based on a print system such as a laser beam system or the like. Reference numeral 414 denotes a scanner engine, which executes an image scanning operation under the control of the CPU 401. Note that the scanner engine 414 has a paper feed mechanism such as an ADF or the like.

The operations of respective classes shown in FIG. 1A will be described below using flowcharts. Note that FIG. 1A is a static class diagram showing the logical configuration, and an example of the physical allocation of these classes are as has been explained using FIG. 2

The internal arrangement of the client PC 211 or 212 or the server PC 221 in FIG. 2 is as shown in FIG. 4, and the internal arrangement of the copying machine 231 or 232 in FIG. 2 is as shown in FIG. 5. In the following descriptions using the flowcharts, the decision making and execution on the PC are attained by the CPU 301 in the PC, and those on the copying machine are attained by the CPU 401 in the copying machine.

The print operation in the printer driver 103 will be described below using FIG. 6.

Figure 6:
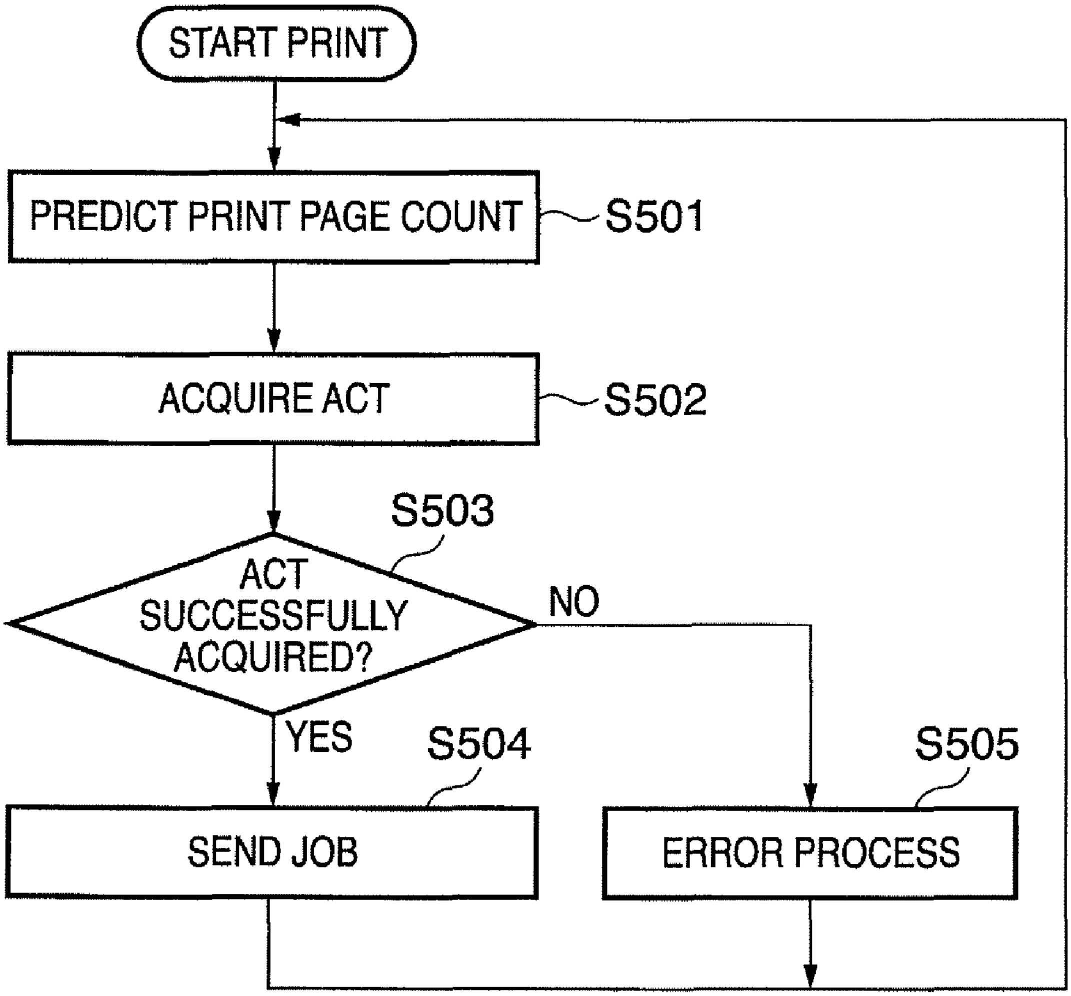
FIG. 6 is a flowchart showing the print operation of a printer driver according to the first embodiment of the present invention.

FIG. 6 is a flowchart showing the print operation in the printer driver according to the first embodiment of the present invention.

This print operation starts when the user designates document data to be printed using, e.g., the keyboard 309 or a pointing device (not shown) and inputs a print instruction of that document data on the client PC 211 or 212. Or the print operation starts when the user selects a print command from a menu on a running application.

Upon starting the print operation, the CPU 301 predicts a print page count in step S501. The print page count may be described in the header of document data to be printed passed to the printer driver 103, or may be predicted by analyzing a rendering command group given to the printer driver 103.

Note that prediction of the print page count in step S501 is an option. If prediction of a print page count is skipped, the underlying basis of the present invention will not be impaired. The predicted printed page count is stored as a temporary variable in the RAM 303 as a temporary storage area.

In step S502, the CPU 301 requests the ticket issuing server 102 to issue an ACT 107. More specifically, the CPU 301 controls the NIC 308 to send a packet group that requests the ticket issuing server 102 to issue an ACT 107. Furthermore, the CPU 301 waits for a response to that request. Upon reception of the response, the CPU 301 extracts and reconstructs reception data from received packets, and stores the reconstructed data in a buffer area which is assured in advance on the RAM 303 as a temporary storage area.

A series of operations described above can be implemented by, e.g., Send, Listen, and Receive operations using the TCP/IP protocol stack. As an application layer, a scheme such as Web Services or the like may be used.

Upon requesting the ticket issuing server 102 to issue an ACT 107, as the predicted print page count, the print page count predicted in step S501 may be passed as an argument.

The CPU 301 checks in step S503 if the ACT 107 can be normally acquired, by accessing the data which is received from the ticket issuing server 102 and is stored in the RAM 303 in step S502.

If the ACT 107 can be normally acquired (YES in step S503), the process advances to step S504. In step S504, the CPU 301 converts the document data to be printed into a form of print data which can be sent to the device. The CPU 301 then appends the ACT 107 acquired in step S502 and the authentication information of the user who issued this print job to the print data to form print job data, and sends the print job data to the device (copying machine 104).

Note that conversion of the document data to be printed into print data that can be sent to the device means that, for example, a format of digital data that can be interpreted by an application program is converted into a print command group required to form an image upon printing that digital data. More specifically, the format after conversion indicates, e.g., a PDL (Printer Description Language) format.

As a method of acquiring the user authentication information, the owner of a source process which is called a thread is checked based on the context of that thread which called the printer driver 103. In this manner, which user starts this print process can be detected.

Note that an example of the format of print job data which is to be sent to the device as a combination of the authentication information, ACT, and print data is the aforementioned configuration of FIG. 3.

On the other hand, if the ACT 107 cannot be normally acquired for some reason in step S503 (NO in step S503), the process advances to step S505. In step S505, the CPU 301 executes an error process (e.g., an error notification), and the process returns to step S501.

An example of the contents of the ACT 107 will be described below using FIG. 7.

FIG. 7 shows an example of the ACT according to the first embodiment of the present invention.

This ACT 107 is acquired from the ticket issuing server 102 in step S502 in FIG. 6, and also corresponds to the ACT 602 in FIG. 3.

In the first embodiment, the ACT 107 is described using an XML format, and the underlying basis of the present invention is not limited to the XML format.

In FIG. 7, reference numeral 701 denotes a description area indicating information associated with the user who acquired this ACT 107. This example indicates that the user is "Taro" and is assigned a role "PowerUser", and the mail address of this user is "taro@xxx.yyy".

Reference numeral 702 denotes a description area that describes functions that the user who acquired this ACT 107 can use in the copying machine 104. In this example, a print function from the PC, called "PDL Print", can be used. In particular, this area describes that color printing is permitted, but single-sided printing (Simplex) is inhibited as function limitations upon printing.

Reference numeral 703 denotes a description area that describes the upper limit page counts available for the user who acquired this ACT 107 in the copying machine 104. In this example, this area describes that the upper limit page count for color printing is 1000 in the whole system, and that for monochrome printing is 1000 in the whole system.

A characteristic configuration of the first embodiment will be described below using FIGS. 8 to 10. More specifically, a configuration in which after print job data is sent to the copying machine, the copying machine receives that print job data, executes printing while imposing function limitations according to the ACT included in that print job data, and notifies the counting server of a job execution process amount as a result of printing, will be described below.

The logical configuration of software in the copying machine 104 will be described first using FIG. 8.

Figure 8:
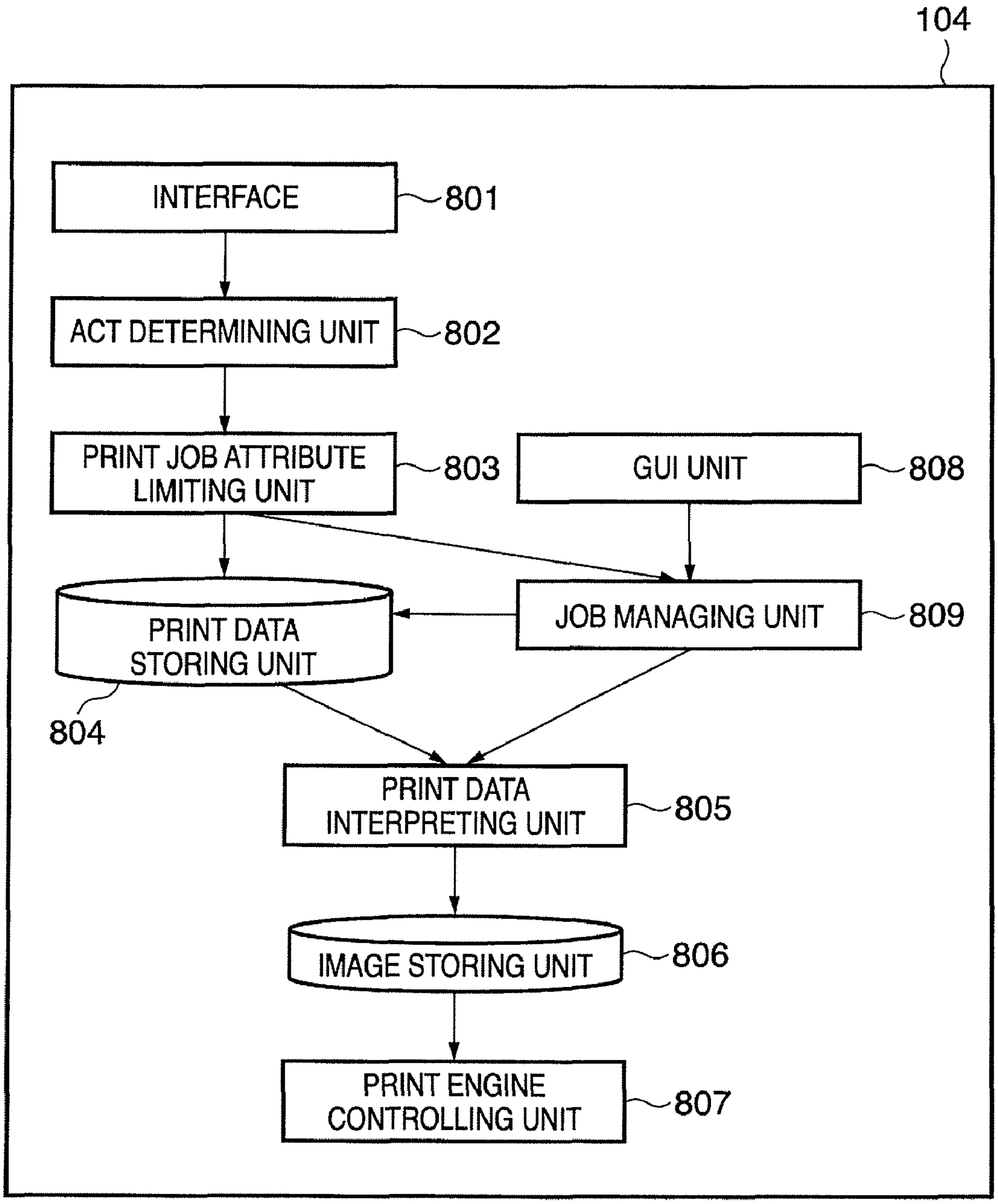
FIG. 8 is a block diagram showing the logical configuration of software in a copying machine according to the first embodiment of the present invention.

FIG. 8 is a block diagram showing the logical configuration of software in the copying machine according to the first embodiment of the present invention.

Referring to FIG. 8, in the copying machine 104, an interface 801 is connected to the network 201, and receives print job data from the client PC 211 or 212. An ACT determining unit 802 analyzes the received print job data, and checks whether or not an ACT 107 is appended, and whether or not that ACT 107 is authentic without being falsified.

A print job attribute limiting unit 803 limits or degenerates attribute information of the print job based on the limitation information described in the ACT 107, and notifies the subsequent stage of this. A print data storing unit 804 temporarily stores print data extracted from the received print job data. A print data interpreting unit 805 extracts the print data from the print data storing unit 804, interprets that print data, and generates print image data. An image storing unit 806 temporarily stores the print image data.

A print engine controlling unit 807 controls the print engine 413 to print the print image data on a paper sheet. A GUI unit 808 interprets a user's instruction input from the operation panel 409, and issues commands that control the job in accordance with the interpretation result. A job managing unit 809 manages the print data stored in the print data storing unit 804.

The print process in the copying machine 104 will be described below using FIG. 9.

Figure 9:
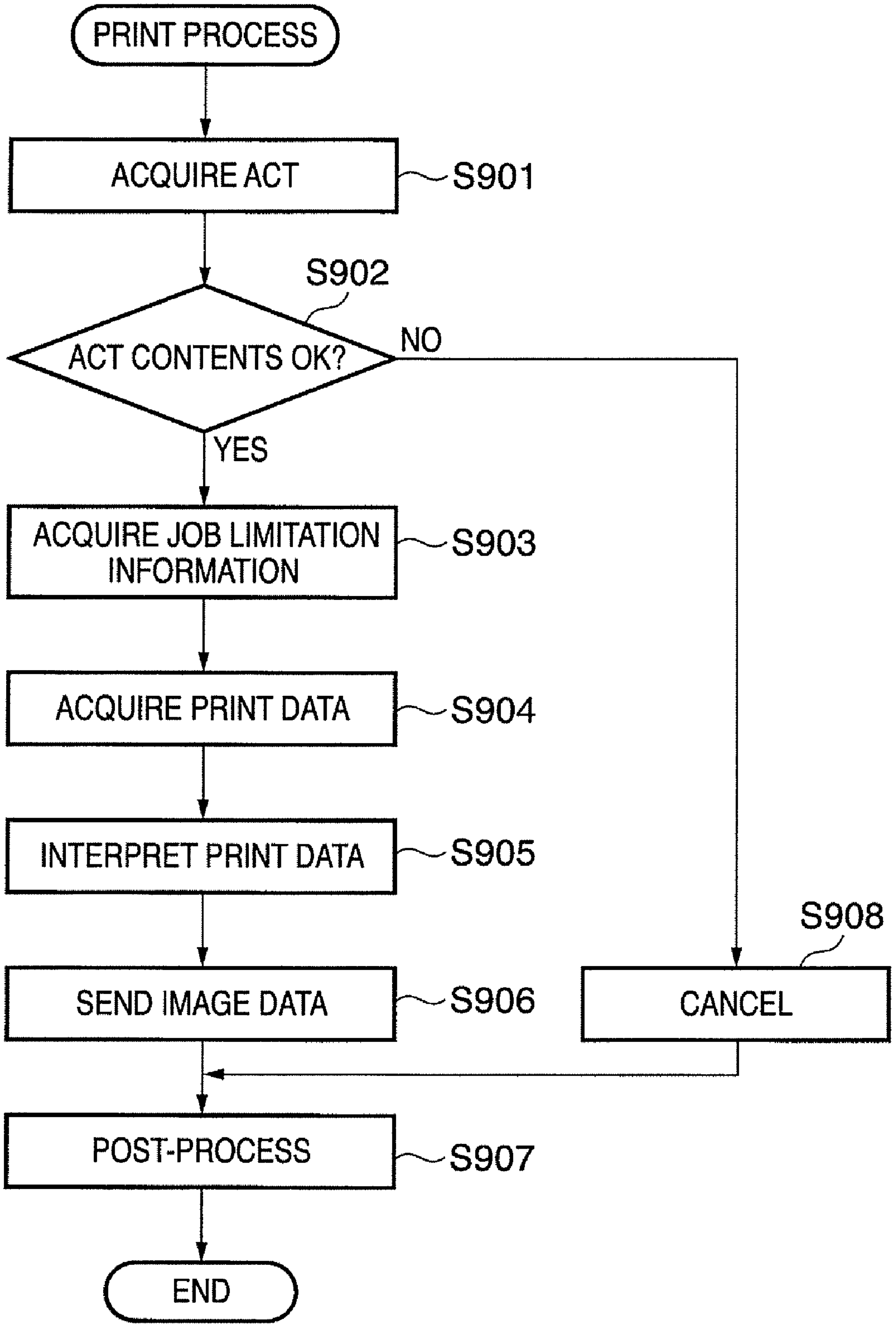
FIG. 9 is a flowchart showing the print process in the copying machine according to the first embodiment of the present invention.

FIG. 9 is a flowchart showing the print process in the copying machine according to the first embodiment of the present invention.

This process is launched as follows. For example, the NIC 408 notifies the CPU 401 of sending of print job data sent from the printer driver 103 to the copying machine 104 using an interrupt signal. In response to this interrupt signal, the CPU 401 controls the NIC 408 to execute reception processing of the print job data, and stores the received print job data in the RAM 403. After that, the CPU 401 launches this process.

Upon launching the print process of the print job data, the ACT determining unit 802 acquires an ACT 602 from the received print job data in step S901. The ACT determining unit 802 confirms in step S902 if the ACT 602 is not falsified. This is a measure necessary to prevent an ill-disposed printer driver from freely changing the ACT to increase functions or the printable page count available for the user.

As a practical method of verifying whether or not the ACT 602 is falsified, the following method is available. For example, the ticket issuing server 102 appends a digital signature to the ACT 602, and verification can be made by confirming that digital signature. Assume that a public key of the ticket issuing server 102 required to verify the signature is stored in advance in the ROM 402 or the large-capacity storage device 411.

As a result of verification in step S902, if the ACT determining unit 802 determines that the ACT 602 is not falsified, and has no problem with its contents (YES in step S902), the process advances to step S903.

In step S903, the print job attribute limiting unit 803 analyzes the ACT 602 to acquire job limiting information associated with functions that can be used by the user. Such job limiting information corresponds to the areas 702 and 703 in FIG. 7. The job limiting information that can be used by the user is sent to the job managing unit 809 as job attribute information, and is stored in the PAM 403 or large-capacity storage device 411 to prepare for the print process later.

Although not specified in FIG. 7, as will be described later, the ACT 602 can include an item (job end immediate notification flag) which gives the instruction to immediately notify the counting server 106 of the end of the job. When the ACT 602 includes that information, that information is also sent to the job managing unit 809 together, and is stored in the RAM 403 or large-capacity storage device 411.

In step S904, the job managing unit 809 acquires print data from the print job data, and passes it to the print data storing unit 804 to temporarily store the print data. In step S905, the print data interpreting unit 805 extracts the print data temporarily stored in the print data storing unit 804 in step S904, and executes a process for converting that print data into the format of print image data. In this case, the print data interpreting unit 805 reads out the job limiting information, which is passed to the job managing unit 809 and is temporarily stored in step S903, and is associated with the functions that can be used by the user, from the job managing unit 809, and uses it as limiting information upon interpreting the print data.

More specifically, for example, if the remaining printable page count is smaller than the number of actual pages of the print job interpreted in print data interpretation, generation of image data is aborted at that time. Alternatively, when the user is not permitted to execute color printing, but he or she sends print data which requires color printing, the print data is interpreted in a monochrome mode, thus generating monochrome-limited print data.

The generated print image data is passed to the image storing unit 806, and is stored in the large-capacity storage device 411 for the print process later.

In step S906, the print engine controlling unit 807 extracts the image data stored in the large-capacity storage device 411, sends it to the print engine 413, and controls the print engine 413, thus executing the print process on a paper sheet.

In step S907, the job managing unit 809 executes a post-process after the process of the print job data is complete. More specifically, the job managing unit 809 controls the large-capacity storage device 411 to record process amount data of the print job in a log file on the large-capacity storage device 411. More particularly, the contents to be recorded include the user ID, printed page count, information indicating success/failure of the print job, and the like.

When an event reservation list stored on the RAM 403 is checked to find that the counting client 105 requests to send an end notification of the process of the print job, a message that advises accordingly is sent to the counting client 105 in the form of an event notification. In step S903, the jog end immediate notification flag which is stored using the job managing unit 809 is checked, and its value is added as an argument parameter of the event to be sent to the counting client 105. The operation of the counting client 105 will be described later with reference to FIG. 10. Finally, the temporarily used memory area and the temporary work area on the large-capacity storage device 411 are released.

On the other hand, as a result of verification in step S902, if the ACT determining unit 802 determines that the ACT 602 is falsified or has a problem with its contents (NO in step S902), the process advances to step S908.

In step S908, the job managing unit 809 cancels the process of the print job, which is in progress. Upon completion of the process in step S908, the process then advances to step S907.

The operation of the counting client 105 will be described below using FIG. 10.

Figure 10:
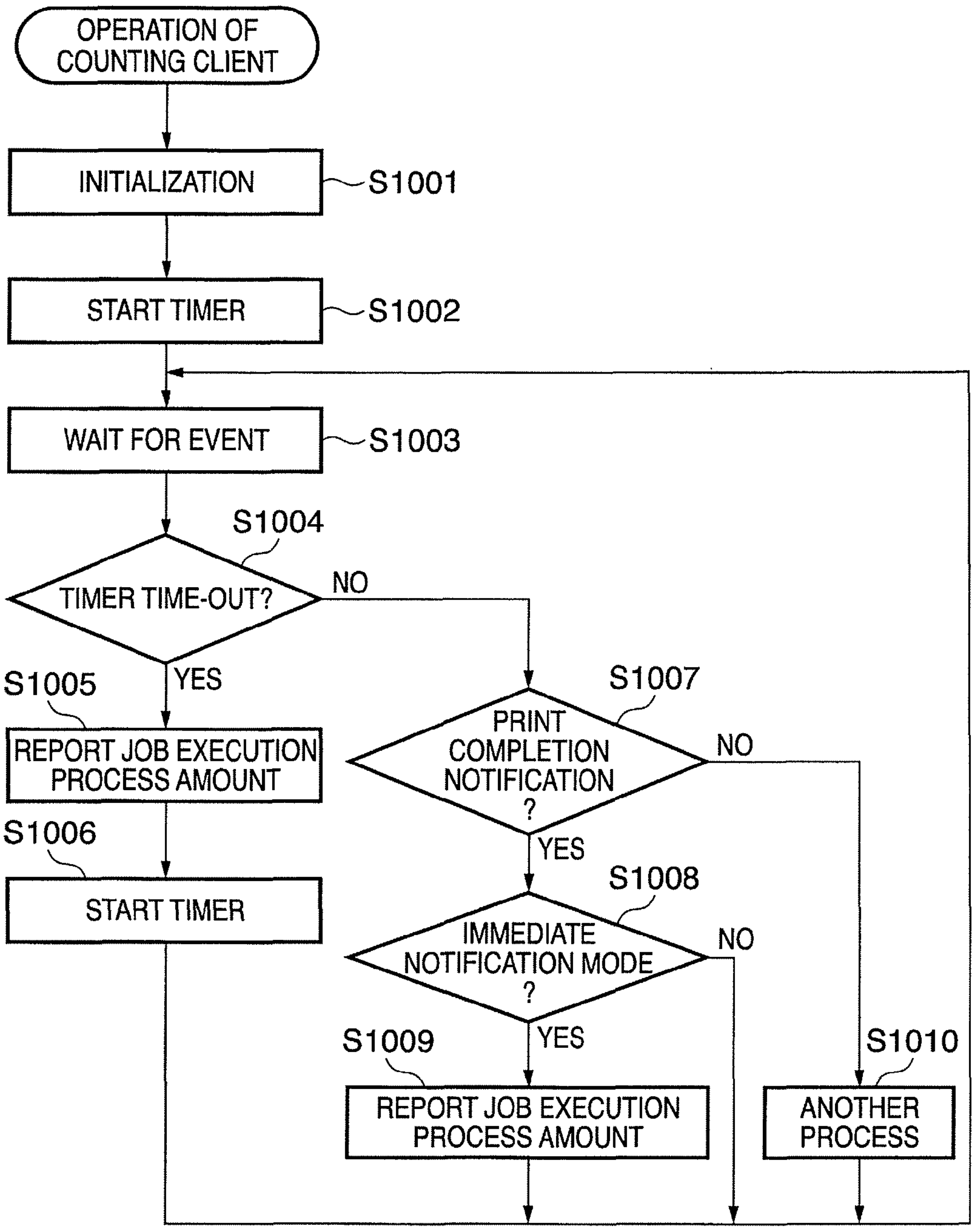
FIG. 10 is a flowchart showing the operation of a counting client according to the first embodiment of the present invention.

FIG. 10 is a flowchart showing the operation of the counting client according to the first embodiment of the present invention.

The counting client 105 is a program module which runs on the copying machine 104. The program code of the counting client 105 is stored in the ROM 402 or large-capacity storage device 411, and is launched upon starting up the copying machine 104.

When the program starts, the CPU 401 reserves an event notification so that an event indicating completion of a print job by the copying machine 104 is to be sent to the counting client 105 in step S1001. More specifically, the CPU 401 writes event reservation information in an event notification reservation area on the RAM 403.

In step S1002, the CPU 401 controls to start the timer 412 so that a timer event occurs after an elapse of a predetermined period of time. This timer 412 is used to notify the counting server 106 of the job execution process amount at given time intervals, as will be described later.

In step S1003, the CPU 401 waits for an event until some event occurs. A typical event includes a timer time-out notification or a print job completion notification from the copying machine 104.

If some event is acquired in step S1003, the CPU 401 checks in step S1004 if the acquired event is a timer time-out notification event. If the acquired event is a timer time-out notification event (YES in step S1004), the process advances to step S1005.

In step S1005, the CPU 401 accesses the large-capacity storage device 411 to acquire the contents of a log file that records the process result of the print job by the copying machine 104. The CPU 401 controls the NIC 408 to send the contents of the log file as process amount information to the counting server 106 which runs on the server PC 221 via the network 201 (to notify the counting server 106 of the contents of the log file). Upon completion of sending, the CPU 401 accesses the large-capacity storage device 411 to delete the already notified job information from the log file.

In step S1006, the CPU 401 controls to start the timer 412 so that a timer event occurs after an elapse of a predetermined period of time. This process is the same as that in step S1002.

Upon completion of the process in step S106, the process returns to step S1003 to wait for the next event.

On the other hand, if it is determined in step S1004 that the event acquired in step S1003 is not a timer time-out notification event (NO in step S1004), the process advances to step S1007. The CPU 401 checks in step S1007 if the event acquired in step S1003 is a print job completion notification from the copying machine 104. If the acquired event is a print job completion notification (YES in step S1007), the process advances to step S1008.

In step S1008, the CPU 401 further interprets the contents of the event acquired in step S1003, and checks, as an argument of the event, an immediate notification mode flag (job end immediate notification flag) indicating whether or not the counting server 106 is immediately notified of completion of the print job. Then, the CPU 401 checks if this flag is set.

If it is determined that the immediate notification mode flag is not set and the immediate notification mode is not selected (NO in step S1008), the process returns to step S1003 to wait for the next event. On the other hand, if it is determined that the immediate notification mode flag is set and the immediate notification mode is selected (YES in step S1008), the process advances to step S1009.

In step S1009, the CPU 401 sends the contents of the log file to the counting server 106 via the network 201 as in step S1005. Since the process in step S1009 is the same as that in step S1005, a repetitive description thereof will be avoided.

Upon completion of the process in step S1009, the process returns to step S1003 to wait for the next event.

If it is determined in step S1007 that the event acquired in step S1003 is not a print job completion notification from the copying machine 104 (NO in step S1007), the process advances to step S1010. In this case, since the type of event acquired in step S1003 is another event, the CPU 401 executes a process according to that event in step S1010. Upon completion of the process in step S1010, the process returns to step S1003 to wait for the next event.

The operation of the counting server 106 will be described below using FIGS. 11 and 12.

FIG. 11 shows an example of process amount data held in the counting server according to the first embodiment of the present invention.

Referring to FIG. 11, a column 1101 stores the IDs of users registered in the system. In this example, three users “taro”, “jiro”, and “hanako” are registered.

A column 1102 stores processed page counts indicating the numbers of printed pages by the users in a monochrome print mode. Likewise, a column 1103 processed page counts in a color print mode.

Columns 1104 and 1105 respectively store the upper limit printable page counts for the respective users in the monochrome print mode and color print mode.

A column 1106 stores in-process job flags each indicating a period from when the ACT is issued for each user until printing is completed (job process in progress). This in-process job flag stored in the column 1106 corresponds to the user job issuing status 108 in FIG. 1A, and assumes a value of “true” or “false”.

A column 1107 stores predicted page counts of paper sheets scheduled to be used in the monochrome print mode during print processes which are being executed by the users. Likewise, a column 1108 stores predicted page counts of paper sheets scheduled to be used in the color print mode.

The process amount data shown in FIG. 11 is stored on, e.g., the large-capacity storage device 311 on the server PC 221.

The overall operation of the counting server 106 will be described below using FIG. 12.

Figure 12:
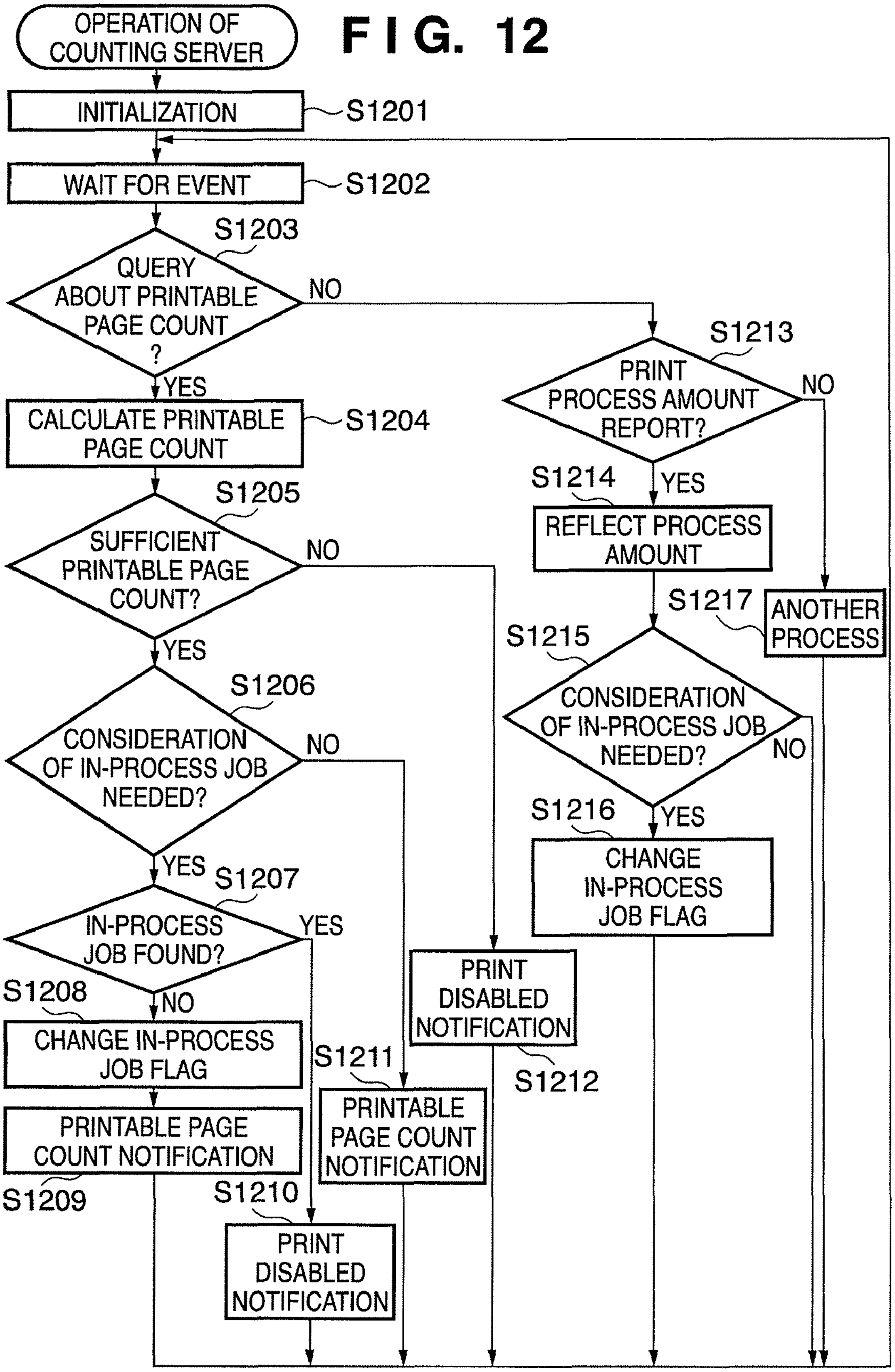
FIG. 12 is a flowchart showing the overall operation of the counting server according to the first embodiment of the present invention.

FIG. 12 is a flowchart showing the overall operation of the counting server according to the first embodiment of the present invention.

The counting server 106 runs on the server PC 221, receives job execution process amounts in each device from the counting client 105 which runs on the copying machine 231 or 232, and tabularizes process amount data of jobs for respective users.

Upon launching the counting server 106, the server 106 (or the CPU 301) executes an initialization process for receiving various process requests from other modules in step S1201. More specifically, for example, the CPU 301 generates a socket as a socket API of TCP/IP, and then executes a Listen process to set the generated socket in a standby state. This is to set that the CPU 301 controls the NIC 308, and upon reception of a communication request from another module, the NIC 308 notifies the CPU 301 of that request in the form of an interrupt signal.

Assume that an interrupt vector and interrupt process routine are programmed so that the CPU 301 which received the interrupt signal from the NIC 308 assures an area called an event on the RAM 303 based on that interrupt signal, and enters that event into an event queue (not shown). These are processes of a socket library. In this way, the interrupt signal which is sent from the NIC 308 to the CPU 301 is processed in the form of an event in terms of execution of software.

Furthermore, as a part of the initialization process, the CPU 301 accesses the user information server 101 to acquire the value of the ACT issuing policy flag 109.

In step S1202, the CPU 301 waits for generation of an event so as to wait for a communication request from another module. If an event is generated, the CPU 301 temporarily stores that event in the RAM 303, and the process advances to step S1203.

The CPU 301 checks in step S1203 if the event acquired in step S1202 is a query about the printable page count from the ticket issuing server 102.

If the acquired event is a query about the printable page count (YES in step S1203), the process advances to step S1204.

Note that if the event acquired in step S1202 is a query about the printable page count, the total of three arguments, i.e., the user ID, the predicted print page count, and a flag indicating whether or not the job issuing status need be considered, are appended to that event.

In step S1204, using the user ID of these three arguments first, the CPU 301 calculates a remaining printable page count (printable page count) by the user having that user ID.

More specifically, the CPU 301 acquires a record corresponding to the user ID from the process amount data (FIG. 11) held by the counting server 106. The CPU 301 can calculate the remaining printable page count by subtracting the total of the processed page count 1102 or 1103 and the page count 1107 or 1108 scheduled to be consumed by the in-process job from the upper limit page count 1104 or 1105 in that record. The CPU 301 stores the calculated printable page count in the RAM 303 as a temporary variable.

The CPU 301 checks in step S1205 if the printable page count calculated in step S1204 is large enough to print the job to be currently printed. More specifically, the CPU 301 refers to the predicted print page count of the arguments of the event acquired in step S1202, and checks if that value is equal to or smaller than the printable page count calculated in step S1204.

If the printable page count is large enough to print the job to be currently printed (YES in step S1205), the process advances to step S1206.

The CPU 301 checks in step S1206 if the in-process job need be considered, upon returning the printable page count to the ticket issuing server 102. More specifically, the CPU 301 refers to the value of the ACT issuing policy flag 109 which is acquired from the user information server 101 and is stored in the RAM 303 in step S1201. If that value is "true", the CPU 301 determines that the in-process job need be considered; otherwise, it determines that the in-process job need not be considered.

If the in-process job need be considered (YES in step S1206), the process advances to step S1207.

The CPU 301 checks in step S1207 if there is an in-process job (an incomplete job whose ACT has been issued). More specifically, the CPU 301 refers to the value of a record indicating information of the user of interest in the in-process job flag stored in the column 1106 indicating whether or not there is an in-process job for that user. If this value is "true", the CPU 301 determines that there is an in-process job; if this value is "false", it determines that there is no in-process job.

If there is no in-process job (NO in step S1207), the process advances to step S1208.

In step S1208, the CPU 301 changes the value of the in-process job flag 1106 of that user to "true" as a value which indicates that the ACT has been issued, but a job using the ACT is not complete yet. Furthermore, the CPU 301 stores the predicted print page count included in the arguments of the event acquired in step S1202 in the column 1107 or 1108 as that to be consumed by the in-process job.

In step S1209, the CPU 301 controls the NIC 308 to communicate with the ticket issuing server 102, and notifies the ticket issuing server 102 of the printable page count calculated in step S1204.

On the other hand, if it is determined in step S1207 that there is an in-process job (YES in step S1207), the process advances to step S1210. In order to prevent the page count from exceeding the printable upper limit value due to double issuance of the ACTs, the CPU 301 controls the NIC 308 to communicate with the ticket issuing server 102 and notifies the server 102 that printing is disabled due to the presence of the in-process job in step S1210.

If it is determined in step S1206 that an in-process job need not be considered (NO in step S1206), the process advances to step S1211. In step S1211, the CPU 301 controls the NIC 308 to communicate with the ticket issuing server 102, and notifies the ticket issuing server 102 of the printable page count calculated in step S1204.

If it is determined in step S1205 that the printable page count is not large enough (NO in step S1205), the process advances to step S1212. In step S1212, the CPU 301 controls the NIC 308 to communicate with the ticket issuing server 102 and notifies the server 102 that printing is disabled due to the insufficient printable page count.

Upon completion of the processes in steps S1209 to S1212, the process returns to step S1202 to wait for the next event.

On the other hand, if it is determined in step S1203 that the event acquired in step S1202 is not a query about the printable page count (NO in step S1203), the process advances to step S1213.

The CPU 301 checks in step S1213 if the event acquired in step S1202 is a print process amount report from the counting client 105 which runs on the copying machine 104.

If the acquired event is a print process amount report (YES in step S1213), the process advances to step S1214.

In step S1214, the CPU 301 executes a process for reflecting the process amount about the printed page count notified from the counting client 105 to the process amount data held by the counting server 106. More specifically, the CPU 301 adds the process amount about the printed page count notified from the counting client 105 to the process amount value so far stored in the column 1102 or 1103, and stores the sum in the column 1102 or 1103 as a new process amount value.

The CPU 301 checks in step S1215 if an in-process job need be considered, as in the process in step S1206.

If an in-process job need be considered (YES in step S1215), the process advances to step S1216.

In step S1216, the CPU 301 changes the value of the in-process job flag stored in the column 1106 for the user whose process amount is notified, and resets the value in the column 1107 or 1108 that stores the predicted print page count of the in-process job to zero.

On the other hand, if it is determined in step S1213 that the event acquired in step S1202 is not a print process amount report (NO in step S1213), the process advances to step S1217. In this case, since the type of event acquired in step S1213 is another event, the CPU 301 executes a process according to that event in step S1217.

If the process in step S1216 is complete, if it is determined in step S1215 that an in-process job need not be considered (NO in step S1215), or if the process in step S1217 is complete, the process returns to step S1202 to wait for the next event.

In the above description, upon acquiring the value of the ACT issuing policy flag 109, the counting server 106 communicates with the user information server 101 to acquire that value. However, the present invention is not limited to such a specific process. Also, upon sending a query about the printable page count from the ticket issuing server 102 to the counting server 106, this process can be implemented by transferring that value as an argument.

The overall operation of the ticket issuing server 102 will be described below using FIG. 13.

Figure 13:
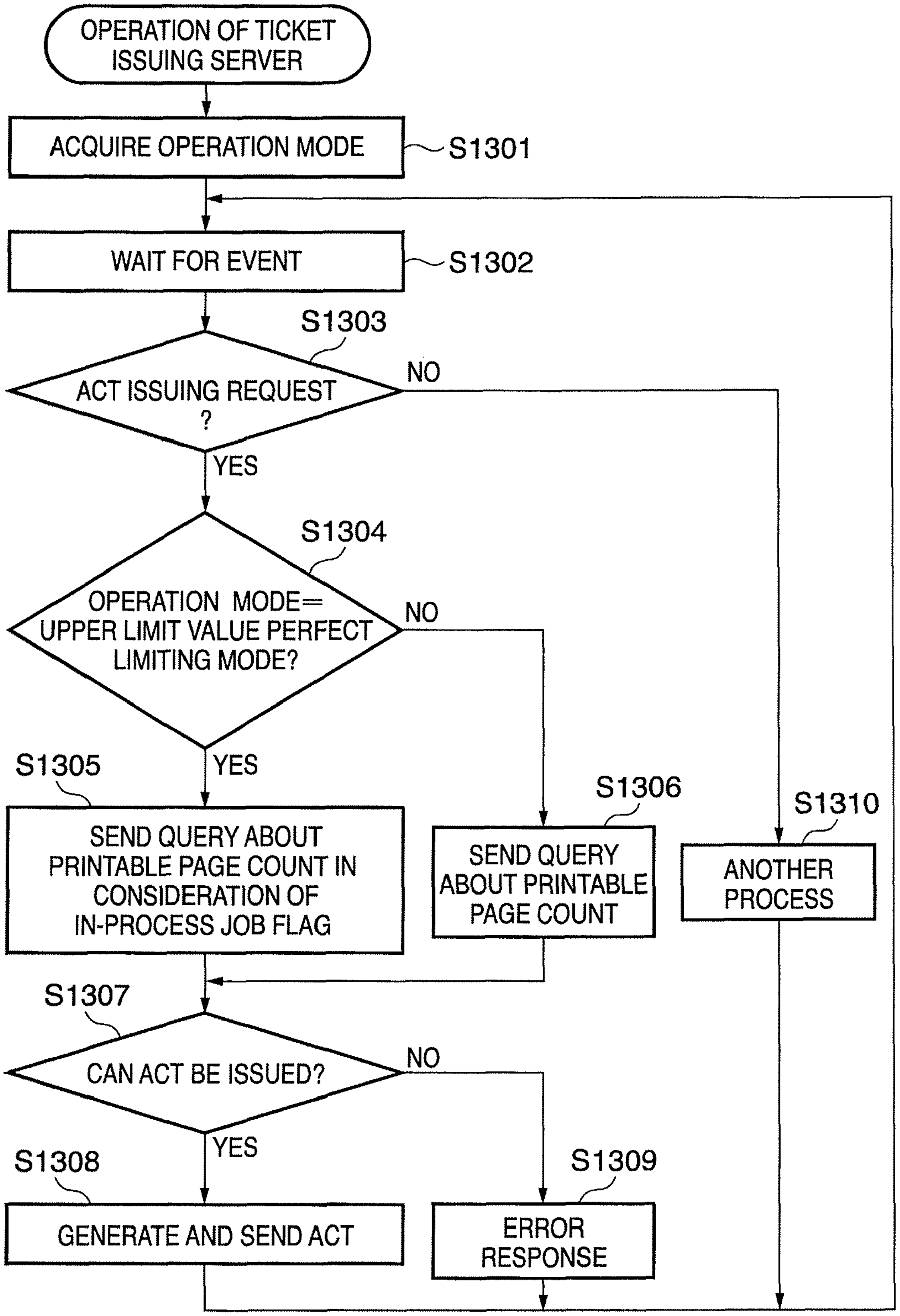
FIG. 13 is a flowchart showing the overall operation of a ticket issuing server according to the first embodiment of the present invention.

FIG. 13 is a flowchart showing the overall operation of the ticket issuing server according to the first embodiment of the present invention.

Upon launching the ticket issuing server 102, the server 102 (or the CPU 301) communicates with the user information server 101 to acquire the value of the ACT issuing policy flag 109 in step S1301. The CPU 301 stores the acquired value of the ACT issuing policy flag 109 in the RAM 303 as a temporary variable to prepare for reference later.

In step S1302, the CPU 301 waits until an event is issued. Upon issuance of an event, the CPU 301 temporarily stores that event in the RAM 303, and the process advances to step S1303.

The CPU 301 checks in step S1303 if the event acquired in step S1302 is an ACT issuing request from the printer driver 103.

If the acquired event is an ACT issuing request (YES in step S1303), the process advances to step S1304. The CPU 301 checks in step S1304 if the operation mode of the ticket issuing server 102 is an upper limit value perfect limiting mode. More specifically, the CPU 301 refers to the value of the ACT issuing policy flag 109 which is acquired and is stored in a RAM 303 in step S1302. If that value is "true", the CPU 301 determines that the operation mode is an upper limit value perfect limiting mode; if that value is "false", it determines that the operation mode is not an upper limit value perfect limiting mode.

Note that the upper limit value perfect limiting mode is a strict operation mode which strictly applies control for preventing the amount of consumption of assigned resources for each user from exceeding the upper limit value. On the other hand, a mode which is not the upper limit value perfect limiting mode is a lenient operation mode which accepts a job issuing request from a given user if at least some of the resources assigned to that user remain.

Also, an administrator utility which implements an operation dialog that allows, e.g., only the administrator to operate is used to set this mode (the value of the ACT issuing policy flag 109).

If it is determined in step S1304 that the operation mode of the ticket issuing server 102 is not an upper limit value perfect limiting mode (NO in step S1304), the process advances to step S1306. In step S1306, the CPU 301 controls the NIC 308 to communicate with the counting server 106, and sends a query about the printable page count to the server 106. If a reply is obtained from the counting server 106 in response to the query, the process advances to step S1307.

On the other hand, if it is determined in step S1304 that the operation mode of the ticket issuing server 102 is an upper limit value perfect limiting mode (YES in step S1304), the process advances to step S1305. In step S1305, the CPU 301 controls the NIC 308 to communicate with the counting server 106, and sends a query about the printable page count to the server 106. In this case, the CPU 301 sends as an argument a message indicating that the in-process job flag stored in the column 1106 need be considered to the query command the server 106. If a reply is obtained from the counting server 106 in response to the query, the process advances to step S1307.

The CPU 301 checks in step S1307 based on the reply obtained from the counting server 106 in step S1305 if an ACT can be issued. If an ACT cannot be issued (NO in step S1307), the process advances to step S1309. On the other hand, if an ACT can be issued (YES in step S1307), the process advances to step S1308.

In the checking process in step S1307, in case of the reply to the query in step S1305, the CPU 301 receives as a reply a printable notification/print disabled notification based on the value of the in-process job flag and the printable page count from the counting server 106. That is, since the reply to the query in step S1305 has the contents in either step S1209 or S1210 in FIG. 12, the CPU 301 issues an ACT based on the reply contents. More specifically, if the reply contents are a printable notification, the CPU 301 issues an ACT; if the reply contents are a print disabled notification, the CPU 301 denies issuance of an ACT.

Likewise, in case of the reply to the query in step S1306, since the reply has the contents in either steps S1211 and 1212 in FIG. 12, the CPU 301 issues an ACT based on the reply contents.

In the checking process as to whether or not to issue an ACT, the ticket issuing server 102 may acquire the value of the in-process job flag and printable page count from the counting server 106, and may check based on these values if an ACT can be issued. In addition to these pieces of information, a user's role (access authority) may be managed as process amount data, and whether or not an ACT can be issued may be determined additionally based on this process amount data.

In step S1308, the CPU 301 generates an ACT shown in FIG. 7, appends a digital signature to the ACT to guarantee its authenticity, and then controls the NIC 308 to communicate with the printer driver 103. After that, the CPU 301 sends the ACT to the printer driver 103.

In step S1309, the CPU 301 controls the NIC 308 to communicate with the printer driver 103, and notifies the printer driver 103 that an ACT cannot be issued (error response).

On the other hand, if it is determined in step S1303 that the event acquired in step S1302 is not an ACT issuing request from the driver 103 (NO in step S1303), the process advances to step S1310. In this case, since the type of event acquired in step S1303 is another event, the CPU 301 executes a process according to that event in step S1310.

Upon completion of the process in step S1308, S1309, or S1310, the process returns to step S1302 to wait for the next event, thus continuing the process.

As described above, according to the first embodiment, the functions and the upper limit value of resources available for each user can be set in advance, and can be integrally managed. Also, even when each user makes operations for a device at a plurality of nodes, control that can prevent the consumption amount of resources assigned to that user from exceeding its upper limit value can be implemented.

Also, by adaptively switching a case wherein the use limitations of resources for each user are to be strictly managed and a case wherein the limitations are allowed to be relaxed to some extent, the overall system can be managed. That is, a system having flexibility with respect to control associated with use limitations can be implemented according to use applications and purposes.

Second Embodiment

In the arrangement of the first embodiment, the ACT issuing policy flag 109 is a unique one in the whole system so as to specify the process policy of the entire system. However, the present invention is not limited to this. For example, by assigning the ACT issuing policy flags 109 to respective users, the ACT issuing policies can be set for the respective users.

Figure 14:
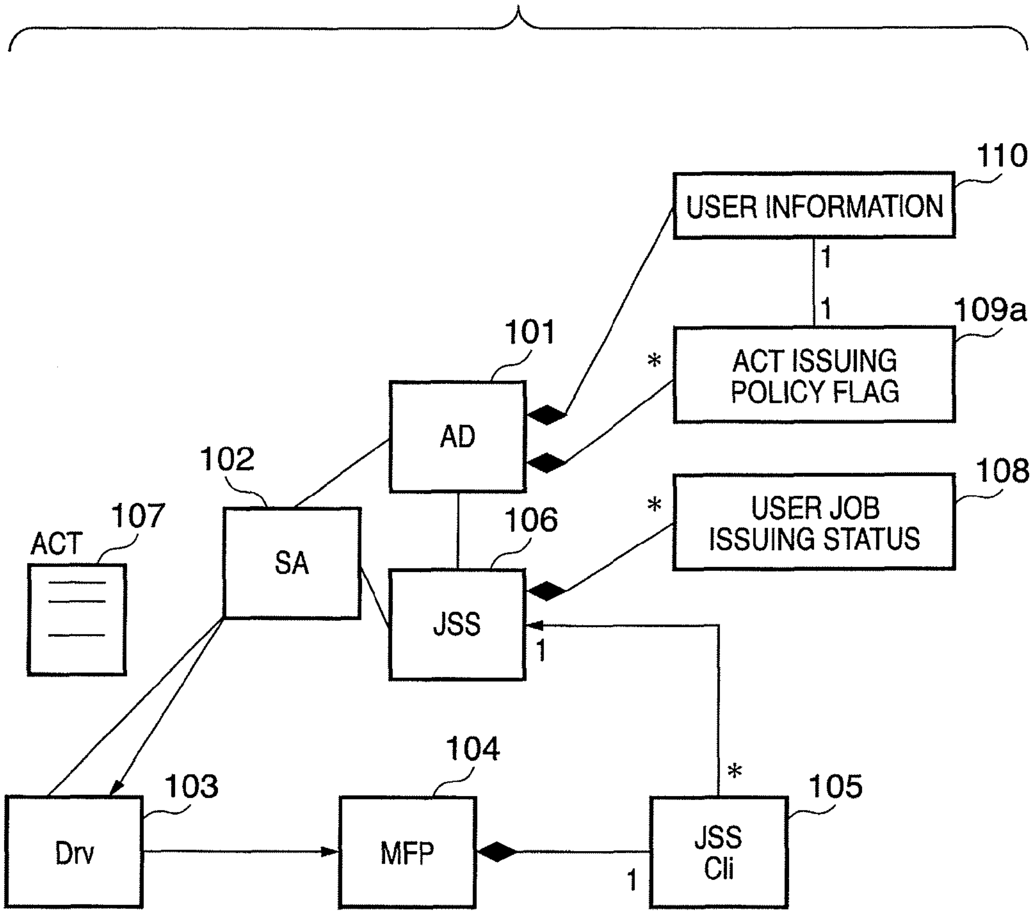
FIG. 14 is a class diagram showing the logical configuration of the overall device managing system according to the second embodiment of the present invention.

FIG. 14 is a diagram showing the logical configuration of the entire device managing system according to the second embodiment of the present invention.

The same reference numerals in FIG. 14 denote the same components as in FIG. 1A, and a detailed description thereof will be omitted.

In FIG. 14, an ACT issuing policy flag 109*a* is not only one, but it exists in a number as many as the number of users to have one-to-one correspondence with each individual user information, compared to FIG. 1A.

Every time the ticket issuing server 102 or counting server 106 refers to the values of the ACT issuing policy flags 109*a*, it communicates with the user information server 101 to refer to the value of the ACT issuing policy flag 109*a* assigned to each user. In this manner, whether the ACT issuing policy is carried out in the upper limit value perfect limiting mode (strict operation mode) or a mode (lenient operation mode) which is not the upper limit value perfect limiting mode can be controlled for each user.

Third Embodiment

In the first or second embodiment, the printer driver 103 requests the ticket issuing server 102 to issue an ACT 107 under the condition that a printable page count can be predicted beforehand. Even when the printer driver 103 cannot predict a printable page count, the principal part of the present invention will not be impaired.

As can be seen from the above description of the first or second embodiment, the embodiment of the present invention can be applied intact when the printer driver 103 always predicts that a printable page count is zero.

Fourth Embodiment

In the descriptions of the first to third embodiments, the printer driver 103 and copying machine 104 exist on independent nodes. However, the present invention is not limited to this. For example, a configuration in which the printer driver 103 is replaced by an application for sending copy or scan data, which runs on the copying machine is also assumed. In this way, even when the user uses functions of the copying machine by operating its operation panel 409, the ticket issuing control according to the function limitations or the value of the ACT issuing policy flag 109 described in the first or second embodiment can be established.

Fifth Embodiment

In the first to fourth embodiments, the configuration that mainly limits print jobs issued by the printer driver 103 has been explained. However, the present invention is not limited to this. For example, a mechanism for limiting various functions of a device according to the contents described in an ACT 107 can be used intact. In this way, when the user logs on to the copying machine 104 by operating the operation panel 409 so as to use a function such as a copy function or the like of the copying machine 104, the present invention can be used to limit that function.

The configuration in this case will be described below using FIG. 15.

Figure 15:
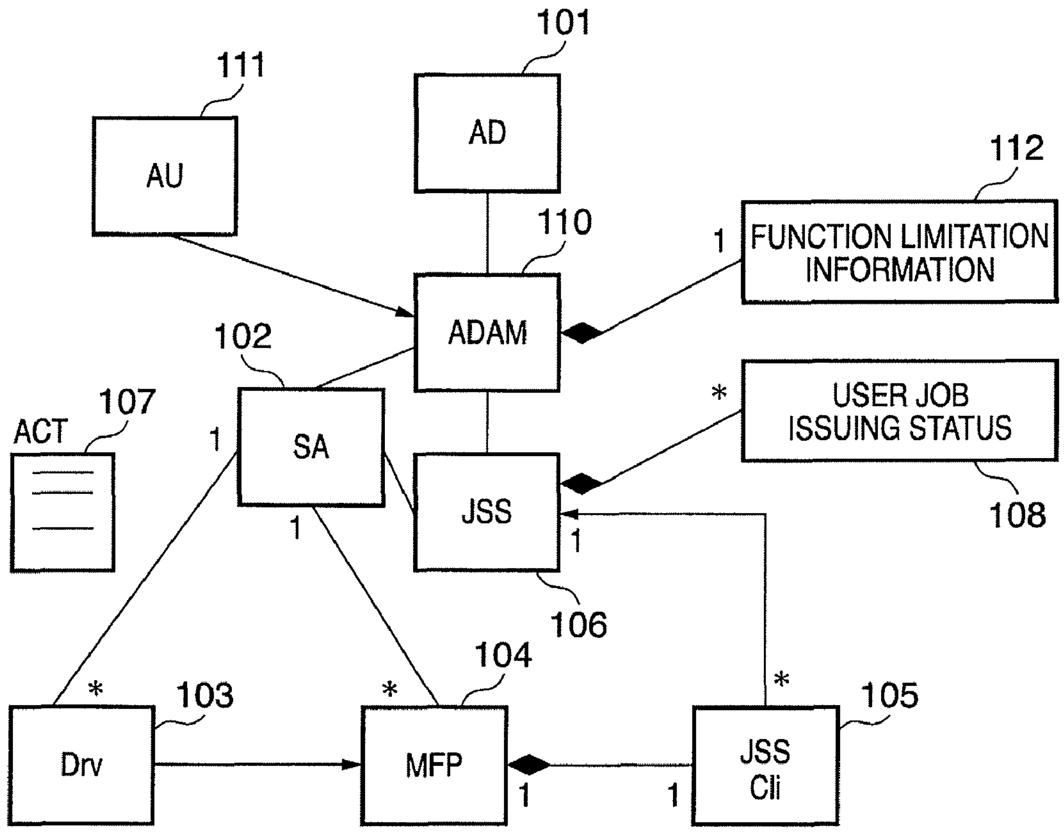
FIG. 15 is a class diagram showing the logical configuration of the overall device managing system according to the fifth embodiment of the present invention.

FIG. 15 is a class diagram showing the logical configuration of the overall device managing system according to the fifth embodiment of the present invention.

In the configuration of FIG. 15, some classes are added to the class diagram of FIG. 1A.

Reference numeral 110 denotes an Active Directory Application Mode (ADAM). When the user information server 101 is an Active Directory server, the ADAM 110 operates in collaboration with that server, and holds function limitation information 112 which defines devices or functions that can be used by each user.

Note that the ADAM 110 is not indispensable to the device managing system. When the ADAM 110 is not installed, the user information server 101 may hold, instead, various kinds of information such as the function limitation information 112, ACT issuing policy flag 109, and the like, which are held by the ADAM 110.

The reason why the user information server 101 and ADAM 110 are separated mainly lies in the management policy of a site that implements the device managing system of the present invention. In order to store the function limitation information 112 in the user information server 101, a schema of the user information server 101 must be extended. However, in the site with the policy that does not allow for extension of the schema, the ADAM 110 may be installed to store the function limitation information 112 and ACT issuing policy flag 109.

Reference numeral 111 denotes an administrator utility. An administrator sets functions available for each user by operating the administrator utility 111. This setting value is stored in the ADAM 110 as the function limitation information.

The ADAM 110 may be allocated on the same node as the user information server 101 or on another node. The administrator utility 111 may exist as a standalone program. Alternatively, the administrator utility 111 may be implemented as a program that runs on a Web server, and the administrator may operate the program on the Web server using a Web browser which runs on the client PC.

Figure 16:
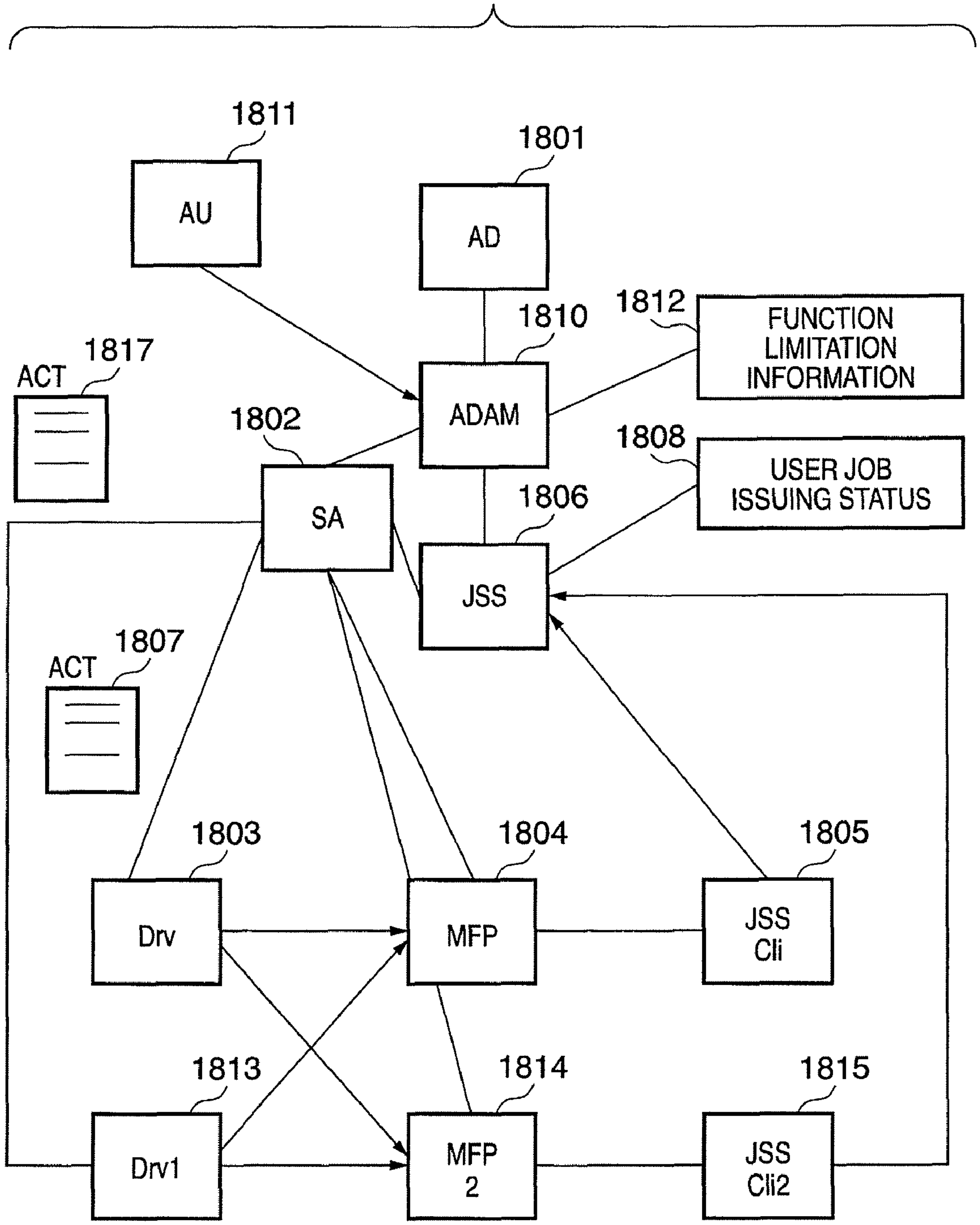
FIG. 16 is a block diagram showing the logical configuration of the overall device managing system according to the fifth embodiment of the present invention.

FIG. 15 explains the configuration of the device managing system using the UML description method. By contrast, FIG. 16 shows the configuration described as a normal block diagram. In FIG. 15, respective rectangular building components indicate classes. However, in FIG. 16, rectangular building components represent instances as entities upon actual operations. In FIG. 15, a multiplicity indicating how many instances the class of interest is likely to generate is described at the end of each line which represents the relationship between neighboring classes. By contrast, since FIG. 16 is a normal block diagram, and the rectangular building components indicate instances, no multiplicity is described.

In particular, FIG. 16 is a block diagram taking a case of two MFPs 1804, 1814 as an example, and describes the same arrangement as in FIG. 2 of the first embodiment. However, the number of MFPs is not limited to this.

In FIG. 16, reference numerals 1801 to 1808 respectively correspond to reference numerals 101 to 108 in FIG. 15. Also, reference numerals 1813 to 1815 and 1817 respectively correspond to reference numerals 103 to 105 and 107 in FIG. 15. Furthermore, reference numerals 1810 to 1812 respectively correspond to reference numerals 110 to 112 in FIG. 15.

An example of an operation dialog implemented by the administrator utility 111 will be described below using FIGS. 17A and 17B.

FIGS. 17A and 17B show an example of the operation dialog of the administrator utility according to the fifth embodiment of the present invention.

An operation dialog 1600 in FIG. 17A is used to assign authorities of operations permitted to a role of each of the administrator, general users, and the like. This operation dialog 1600 roughly includes three areas, i.e., a role information display area 1601, function limitation setting area 1607, and application limitation setting area 1602.

The role information display area 1601 displays information associated with a role for which the function limitation information is to be set. In the example of FIG. 17A, settings are made for a role "My Role".

The function limitation setting area 1607 is used to set the levels of use permission of respective functions of a device for the role to be set displayed on the role information display area 1601. The function limitation setting area 1607 further includes two areas, i.e., a device function category limitation setting area 1603 and application function limitation setting area 1604.

The device function category limitation setting area 1603 allows to set which of respective tabs for respective function categories displayed on the operation unit (operation panel 409) are to be displayed. On the other hand, the application function limitation setting area 1604 allows to set the levels of operations in respective functions of the device such as a print function, copy function, scan function, data sending function, and the like.

The application function limitation setting area 1604 is further divided into some areas for respective device functions. For example, the area 1604 includes an area 1605 associated with printing, an area 1606 associated with sending of data or files to outside the MFP (so-called Send or transmission function), and the like.

The application limitation setting area 1602 allows for setting whether or not each of applications installed in the device can be operated.

As for the difference between the application function limitation setting area 1604 and application limitation setting area 1602, the former sets comprehensive limitations for application groups, while the latter sets limitations for individual applications.

An example of an ACT 107 which is received from the ticket issuing server 102 by the copying machine 104 in the fifth embodiment will be described below using FIGS. 18A and 18B.

FIGS. 18A and 18B show an example of an ACT according to the fifth embodiment of the present invention.

This ACT 107 is received from the ticket issuing server 102 by the following process. After the user logs on to the copying machine 104 using the operation panel 409, he or she issues a request of the ACT 107 to the ticket issuing server 102. In response to this request, the ticket issuing server 102 sends a response to the copying machine 104, thereby receiving the ACT 107.

The ACT shown in FIGS. 18A and 18B have the same data structure as in the example of the ACT shown in FIG. 7 of the first embodiment. Note that the ACT shown in FIG. 7 mainly describes limitations or rights associated with a print job. By contrast, the ACT shown in FIGS. 18A and 18B describe limitations or rights of functions that can be operated from the operation panel of the device (copying machine 104), unlike in FIG. 7.

Referring to FIGS. 18A and 18B, reference numeral 1701 denotes a description area that describes limitations or rights associated with applications which can run on the device. In this example, the description area 1701 includes two description areas 1702 and 1703. The description area 1702 includes a description about rights or limitations associated with individual applications of the device. The description area 1703 includes a description about limitations or rights associated with application groups installed in the device.

Reference numeral 1704 denotes a description area which describes the levels of operations in respective functions of the device such as a print function, copy function, scan function, data sending function, and the like. In this example, the description area 1704 includes two description areas 1705 and 1706. The description area 1705 includes a description about limitations or rights associated with the print function. The description area 1706 includes a description about limitations or rights associated with the Send function.

The settings of the limitations or rights of the functions in the administrator utility 111 explained using FIGS. 17A and 17B correspond to the description contents described in the ACT 107 explained using FIGS. 18A and 18B. In this case, the application limitation setting area 1602 corresponds to the description area 1702, the device function category limitation setting area 1603 corresponds to the description area 1703, and the application function limitation setting area 1604 corresponds to the description area 1704. Also, the areas 1605 associated with printing corresponds to the description area 1705, and the area 1606 associated with sending corresponds to the description area 1706.

In this way, the ACT 107 describes information associated with limitations of the functions imposed upon operating the copying machine 104 from the operation panel 409. When the user logs on to the copying machine 104 by operating its operation panel 409 and wants to use functions such as a copy function and the like, this embodiment can be used for the purpose of limiting such functions.

This can be used for the purpose of limiting the function of sending a scanned document outside the copying machine 104 in terms of information security. Since tabs or buttons associated with denied functions are not displayed, the visibility of the operation panel can be improved, thus attaining high usability. Since such limitations reduce the number of inquiries to a management department that manages the copying machine, the TOC can be effectively reduced.

A program for controlling the copying machine 400 (FIG. 5) according to the present invention may be externally installed and may be executed by the copying machine 400. In this case, an information group including that program is loaded onto the copying machine 400 from an external storage medium such as a CD-ROM, flash memory, floppy (disk, or the like or via an e-mail message or a network such as personal computer communications or the like. The present invention can also be applied to a case wherein the program is supplied to the copying machine 400 in this way.

Figure 19:
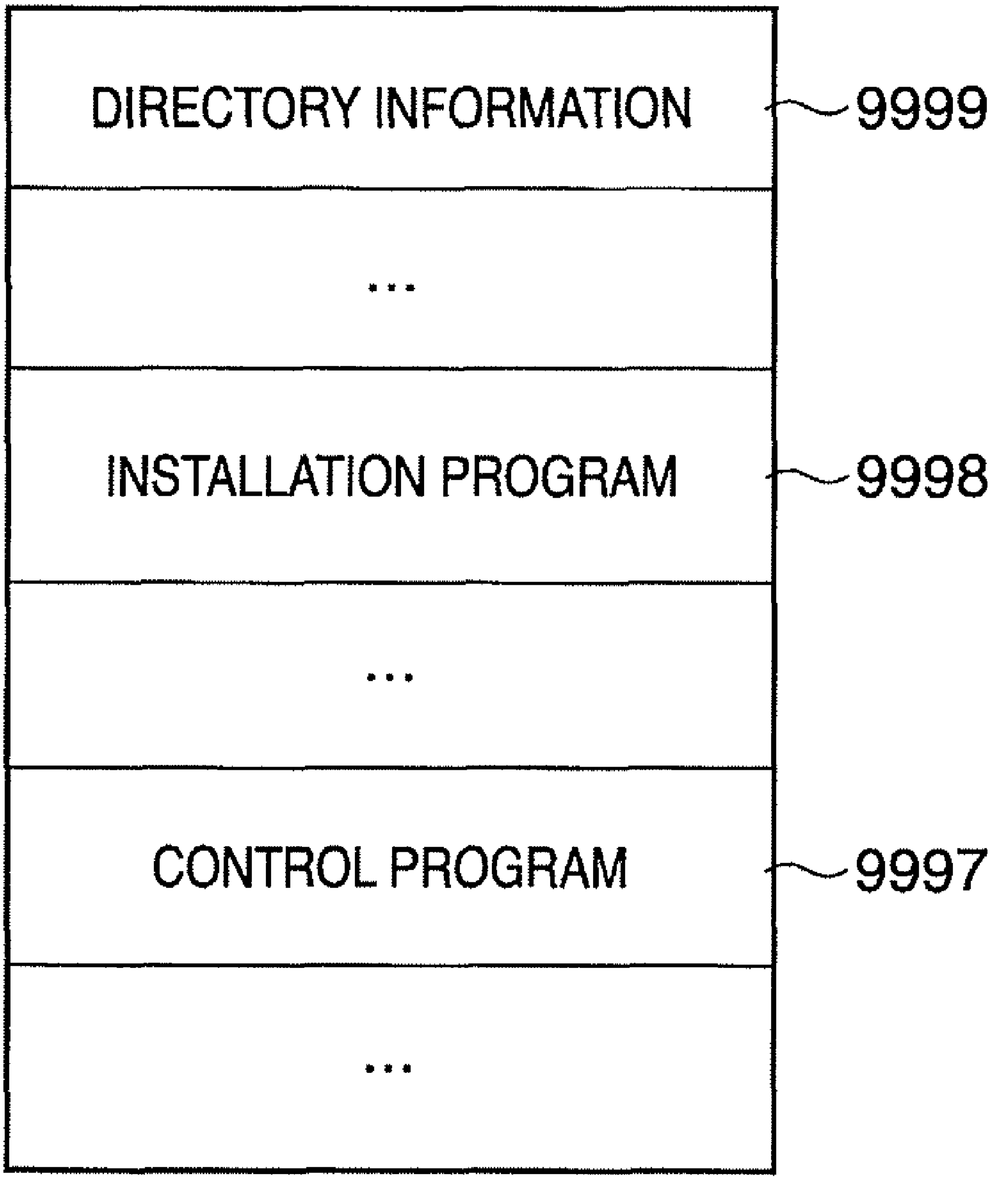
FIG. 19 shows the memory map of a CD-ROM as an example of a storage medium.

FIG. 19 shows the memory map of a CD-ROM as an example of the storage medium.

Reference numeral 9999 denotes an area that stores directory information, which indicate the locations of subsequent areas, i.e., an area 9998 that stores an installation program, and an area 9997 that stores the control program of the copying machine 400. Reference numeral 9998 denotes an area that stores the installation program. Reference numeral 9997 denotes an area that stores the control program of the copying machine 400.

Upon installing the control program of the copying machine according to the present invention in the copying machine 400, the installation program stored in the area 9998 that stores the installation program is loaded onto the system, and is executed by the CPU 401. The installation program executed by the CPU 401 then reads out the control program of the copying machine 400 from the area 9997, and rewrites the contents of the ROM 402 or installs the readout program in the large-capacity storage device 411. In this case, the ROM 402 must be a programmable ROM such as a flash ROM or the like in place of a simple mask ROM.

The above embodiment has explained the counting server which collects output logs of jobs in the system for processing print jobs within the range of an ACT as an example of access limitation information. The information process apparatus which serves as the counting server specifies a user who requests an ACT for a job, and a job whose ACT is issued to that user. The information process apparatus then checks if the process of the specified job is completed. The information process apparatus waits until the specified job is completed. If it is determined that the specified job is complete, the information process apparatus determines a printable page count of the specified user using the output process amount value of the job issued by the user.

The information process apparatus notifies the ticket issuing server 102, as an example of a managing apparatus which issues an ACT, of the determined printable page count. When the ticket issuing server 102 and counting server 106 are implemented by an integrated device, a server program of the counting server 106 notifies a program of the ticket issuing server 102 of the printable page count.

After it is determined that the specified job is complete, the counting server 106 acquires information indicating whether or not the printable page count is to be determined, i.e., an issuing policy flag indicating whether or not the printable page count is to be notified, from the ticket issuing server 102. If the issuing policy flag is OFF, the printable page count of the user may be determined using the output process amount value of the job issued by the user before determination of completion of the specified job.

Upon reception of an output process amount value or output completion notification corresponding to the job issued by the user who requested the specified access right information from an image process apparatus such as a printer or the like, the counting server 106 determines that the process of the job is complete. On the other hand, if the server 106 does not receive any notification, it can determine that the process of the job is not complete yet.

The present invention can be applied to a system constituted by a plurality of devices (e.g., host computer, interface, reader, printer) or to an apparatus comprising a single device (e.g., copy machine, facsimile).

Further, one aspect of the present invention provides a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

According to the above embodiments, there can be provided a device managing system, an information process apparatus, a device, control methods thereof, and a program, which can integrally manage use limitations of functions and resources of the device available for each user, while assuring a high degree of freedom in management.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-100390 filed on Mar. 31, 2006, which is hereby incorporated by reference herein in its entirety.

What is claimed is:

1. A device managing system in which an issuing server which issues access limitation information associated with a device, a client which issues a job including the access limitation information acquired from the issuing server, the device which prints based on the job, and a counting server which counts process amounts in the device for each user, said counting server comprises:

an acquiring unit adapted to acquire a value indicated by an issuing policy flag associated with issuance of the access limitation information and managed by a managing apparatus;

a holding unit adapted to hold, for each user, an in-process job flag indicating if a job process is in progress; and a notifying unit adapted to, when a query about a printable page count in the device for a user of the client which issued the job is received from said issuing server, notify said issuing server of a reply to the query based on the value indicated by the issuing policy flag acquired by said acquiring unit and a value indicated by the in-process job flag, and said issuing server comprises:

a receiving unit adapted to receive an issuing request of access limitation information of the device for the user of the client from the client which issued the job;

a sending unit adapted to send a query about a printable page count in the device to said counting server based on the issuing request received by said receiving unit; and a generating unit adapted to generate the access limitation information based on a reply from said counting server to the query sent by said sending unit.

2. An information process apparatus which collects output logs of jobs in a system for processing print jobs within a range of access limitation information, comprising:

a specifying unit adapted to specify a user who requests access authority information for a job, and to specify a job whose access authority information is issued to that user;

a checking unit adapted to check if a process of the job specified by said specifying unit is completed;

a determining unit adapted to determine a printable page count of the user specified by said specifying unit using an output process amount value of the job issued by the user when said checking unit determines that the job specified by said specifying unit is complete;

a notifying unit adapted to notify a managing apparatus, which issues access authority information, of the printable page determined by said determining unit; and an acquiring unit adapted to acquire information indicating as to whether or not said determining unit determines a printable page count after waiting until said checking unit determines that the job specified by said specifying unit is completed, wherein when the information acquired by said acquiring unit does not indicate that said determining unit determines a printable page count after waiting until said checking unit determines that the job specified by said specifying unit is completed, said determining unit determines the printable page count of the user using an available output process amount value of a job of the user without waiting until said checking unit determines that the job specified by said specifying unit is completed, and said notifying unit notifies the determined printable page count.

3. The apparatus according to claim 2, wherein said acquiring unit acquires, via a network, the information indicating as to whether or not said determining unit determines a printable page count after waiting until said checking unit determines that the job specified by said specifying unit is completed, and wherein the managing apparatus issues access authority information using the printable page count notified by said notifying unit.

4. An information process apparatus which collects output logs of jobs in a system for processing print jobs within a range of access limitation information, comprising:

a specifying unit adapted to specify a user who requests access authority information for a job, and to specify a job whose access authority information is issued to that user;

a checking unit adapted to check if a process of the job specified by said specifying unit is completed;

a determining unit adapted to determine a printable page count of the user specified by said specifying unit using an output process amount value of the job issued by the user when said checking unit determines that the job specified by said specifying unit is complete; and a notifying unit adapted to notify a managing apparatus, which issues access authority information, of the printable page determined by said determining unit, wherein when an image process apparatus notifies an output process amount value or an output completion notification corresponding to the job issued by the user who is specified by said specifying unit and requests access authority information, said checking unit determines that the process of the job is complete, and when the image process apparatus does not notify an output process amount value or an output completion notification, said checking unit determines that the process of the job is not complete yet.

5. The apparatus according to claim 4, wherein when a query about a printable page count of the image process apparatus for the user of a client which issued the job is received from the managing apparatus, said notifying unit notifies the managing apparatus of a reply to the query based on the information which is acquired from the managing apparatus and indicates as to whether or not said determining unit determines a printable page count after waiting until said checking unit determines that the job specified by said specifying unit is completed, and information indicating if a process of the job is in progress.

6. The apparatus according to claim 4, further comprising:

an acquiring unit adapted to acquire a value indicated by an issuing policy flag from the managing apparatus which manages the issuing policy flag associated with issuance of the access limitation information; and a holding unit adapted to hold, for each user, an in-process job flag indicating if a job process is in progress, wherein when a query about a printable page count of the image process apparatus for the user of a client which issued the job is received from the managing apparatus, said notifying unit notifies the managing apparatus of a reply to the query based on the value indicated by the issuing policy flag acquired by said acquiring unit and a value indicated by the in-process job flag.

7. The apparatus according to claim 4, further comprising:

a calculation unit adapted to calculate a printable page count in the image process apparatus for the user in response to a query from the managing apparatus;

a first checking unit adapted to check, as a result of the calculation by said calculation unit, whether or not a predicted print page count included in the query is not more than the printable page count;

a second checking unit adapted to, when said first checking unit determines that the predicted print page count is equal to the printable page count, check based on the value indicated by the issuing policy flag whether or not an in-process job in the image process apparatus need be considered; and a third checking unit adapted to, when said second checking unit determines that the in-process job need be considered, check based on the value of the in-process job flag held by said holding unit whether or not there is an in-process job for the user corresponding to the query, wherein said notifying unit notifies the managing apparatus of a reply to the query based on the checking result of one of said first to third checking unit.

8. A method of controlling an information process apparatus which collects output logs of jobs in a system for processing print jobs within a range of access limitation information, comprising the steps of:

specifying a user who requests access authority information for a job, and a job whose access authority information is issued to that user;

checking if a process of the specified job is completed;

determining, when it is determined that the process of the specified job is complete, a printable page count of the specified user using an output process amount value of the job issued by the user;

notifying a managing apparatus, which issues access authority information, of the determined printable page, and further comprising an acquiring step of acquiring information indicating as to whether or not in said determining step a printable page count is determined after waiting until in said checking step it is determined that the job specified in said specifying step is completed, and wherein when the information acquired in said acquisition step does not indicate that in said determining step, a printable page count is determined after waiting until in said checking step it is determined that the job specified in said specifying step is completed, in said determining step the printable page count of the user is determined using an available output process amount value of a job of the user without waiting until in said checking step it is determined that the job specified in said specifying step is completed, and in said notifying step the determined printable page count is notified.

9. The method according to claim 8, wherein in said acquiring step the information is acquired via a network, the information indicating as to whether or not a printable page count is determined after waiting until it is determined that the specified job is completed, and the managing apparatus issues access authority information using the notified printable page count.

10. A method of controlling an information process apparatus which collects output logs of jobs in a system for processing print jobs within a range of access limitation information, comprising the steps of:

specifying a user who requests access authority information for a job, and a job whose access authority information is issued to that user;

checking if a process of the specified job is completed;

determining, when it is determined that the process of the specified job is complete, a printable page count of the specified user using an output process amount value of the job issued by the user; and notifying a managing apparatus, which issues access authority information, of the determined printable page, wherein when an image process apparatus notifies an output process amount value or an output completion notification corresponding to the job and requests access authority information, in said checking step it is determined that the process of the job is complete, and when the image process apparatus does not notify an output process amount value or an output completion notification, in said checking step it is determined that the process of the job is not complete yet.

11. The method according to claim 10, wherein when a query about a printable page count of the image process apparatus for the user of a client which issued the job is received from the managing apparatus, the managing apparatus is notified, after waiting until it is determined that the job is completed, of a reply to the query, based on the information, which is acquired from the managing apparatus and indicates as to whether or not a printable page count is determined, and information indicating if a process of the job is in progress.

12. The method according to claim 10, further comprising the steps of:

acquiring a value indicated by an issuing policy flag from the managing apparatus which manages the issuing policy flag associated with issuance of the access limitation information; and holding, for each user, an in-process job flag indicating if a job process is in progress, wherein when a query about a printable page count of the image process apparatus for the user of a client which issued the job is received from the managing apparatus, the managing apparatus is notified of a reply to the query based on the value indicated by the acquired issuing policy flag and a value indicated by the in-process job flag.

13. The method according to claim 10, further comprising the steps of:

calculating a printable page count in the image process apparatus for the user in response to a query from the managing apparatus;

checking, as a result of the calculation, whether or not a predicted print page count included in the query is not more than the printable page count;

checking, based on the value indicated by the issuing policy flag, whether or not an in-process job in the image process apparatus need be considered, when it is determined that the predicted print page count is equal to the printable page count, and checking, based on the value of the in-process job flag, whether or not there is an in-process job for the user corresponding to the query, when said second checking unit determines that the in-process job need be considered, wherein the managing apparatus is notified of a reply to the query based on the checking result of one of the three checking steps.

14. A computer-readable storage medium storing a computer program making a computer execute a control method according to claim 8.

* * * * *